US010151840B2

(12) United States Patent
Itoh et al.

(10) Patent No.: US 10,151,840 B2
(45) Date of Patent: Dec. 11, 2018

(54) MEASURING SYSTEM, MEASURING PROCESS, AND NON-TRANSITORY RECORDING MEDIUM

(71) Applicants: Masahiko Itoh, Osaka (JP); Hiroyoshi Sekiguchi, Kanagawa (JP)

(72) Inventors: Masahiko Itoh, Osaka (JP); Hiroyoshi Sekiguchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 365 days.

(21) Appl. No.: 14/960,645

(22) Filed: Dec. 7, 2015

(65) Prior Publication Data
US 2016/0187487 A1 Jun. 30, 2016

(30) Foreign Application Priority Data

Dec. 26, 2014 (JP) ................................. 2014-264602

(51) Int. Cl.
*G01S 17/93* (2006.01)
*G01S 7/48* (2006.01)
*G01S 17/58* (2006.01)
*G01S 17/89* (2006.01)
*G01S 17/87* (2006.01)
(Continued)

(52) U.S. Cl.
CPC .......... *G01S 17/936* (2013.01); *G01S 7/4808* (2013.01); *G01S 17/023* (2013.01); *G01S 17/58* (2013.01); *G01S 17/87* (2013.01); *G01S 17/89* (2013.01); *G01S 2013/9385* (2013.01)

(58) Field of Classification Search
CPC ........ G01S 17/023; G01S 17/87; G01S 17/93; G01S 17/936
See application file for complete search history.

(56) References Cited

U.S. PATENT DOCUMENTS

| 5,633,705 | A | 5/1997 | Asayama |
| 2002/0147534 | A1 | 10/2002 | Delcheccolo et al. |
| 2011/0187863 | A1 | 8/2011 | Glander et al. |
| | | (Continued) | |

FOREIGN PATENT DOCUMENTS

| DE | 19518978 A1 | 11/1995 |
| DE | 102008038731 A1 | 2/2010 |
| | (Continued) | |

OTHER PUBLICATIONS

U.S. Appl. No. 14/710,787, filed May 13, 2015.
(Continued)

*Primary Examiner* — Eric L Bolda
(74) *Attorney, Agent, or Firm* — Cooper & Dunham LLP

(57) ABSTRACT

A measuring system includes a first measuring unit which measures an object in front of a moving body in a first measuring area, a second measuring unit which measures the object in a second measuring area, the second measuring area being different from the first measuring area, a determining unit which determines whether a movement of the object satisfies a predetermined condition based on a measuring result of the first measuring unit, and a controller which causes the second measuring unit to start measuring the object in response to an event in which the determining unit determines that the object satisfies the predetermined condition and at least part of the object deviates from the first measuring area.

13 Claims, 18 Drawing Sheets

(51) Int. Cl.
*G01S 17/02* (2006.01)
*G01S 13/93* (2006.01)

(56) References Cited

U.S. PATENT DOCUMENTS

| | | | | |
|---|---|---|---|---|
| 2015/0197196 | A1* | 7/2015 | Lin | B60Q 9/008 |
| | | | | 340/436 |
| 2016/0207533 | A1* | 7/2016 | Uechi | G08G 1/166 |
| 2016/0209507 | A1* | 7/2016 | Backstrom | G01S 15/931 |

FOREIGN PATENT DOCUMENTS

| | | |
|---|---|---|
| EP | 0952459 A2 | 10/1999 |
| EP | 2793045 A1 | 10/2014 |
| JP | 2007-272441 | 10/2007 |
| JP | 2010-286926 | 12/2010 |

OTHER PUBLICATIONS

May 20, 2016 European Search Report in corresponding European Patent Application No. EP 15199347.4.
Sep. 4, 2018 Japanese official action in connection with corresponding Japanese patent application No. 2014-264602.

* cited by examiner

FIG.9A  $T=t_1$ $D=d_1$ 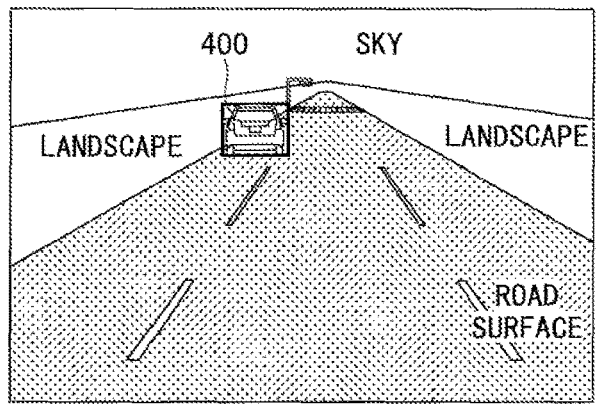
FIG.9B  $T=t_2$ $D=d_2$ 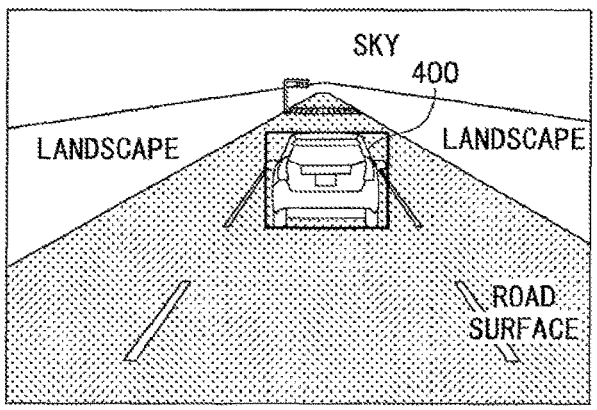
FIG.9C  $T=t_3$ $D=d_3$ 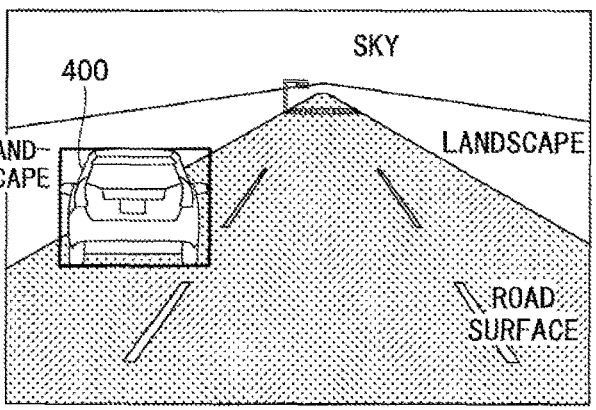
FIG.9D  $T=t_4$ $D=d_4$ 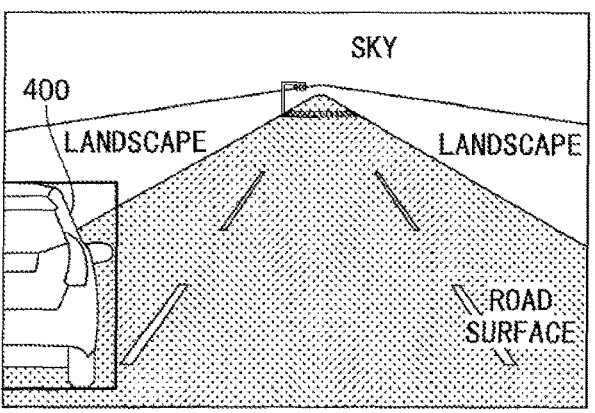

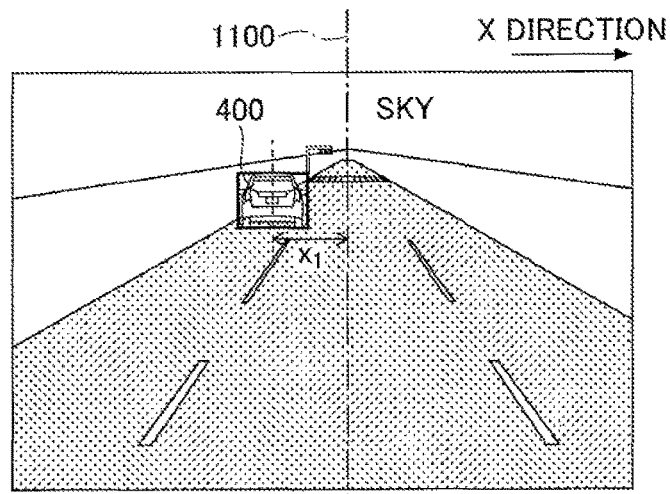
FIG.11A  $T=t_1$
         $D=d_1$
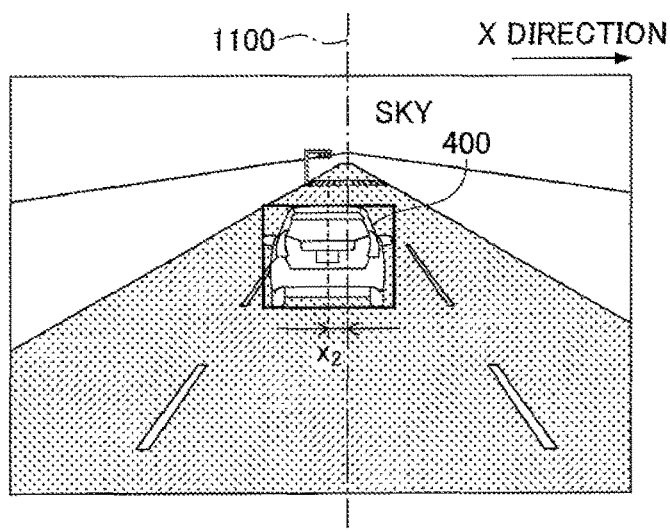
FIG.11B  $T=t_2$
         $D=d_2$
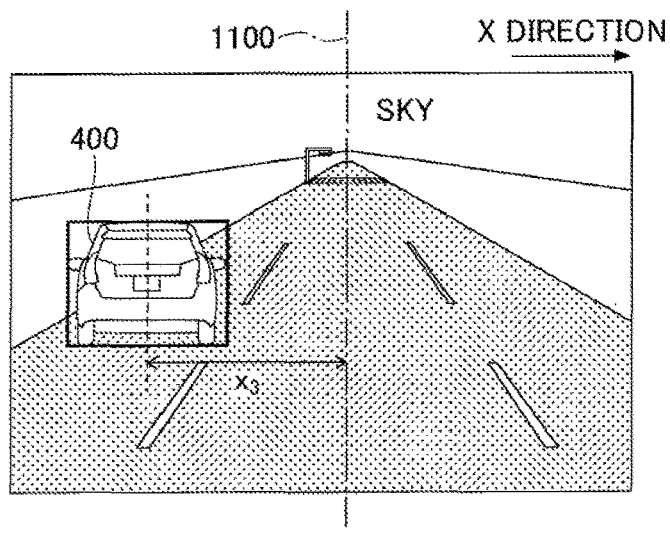
FIG.11C  $T=t_3$
         $D=d_3$

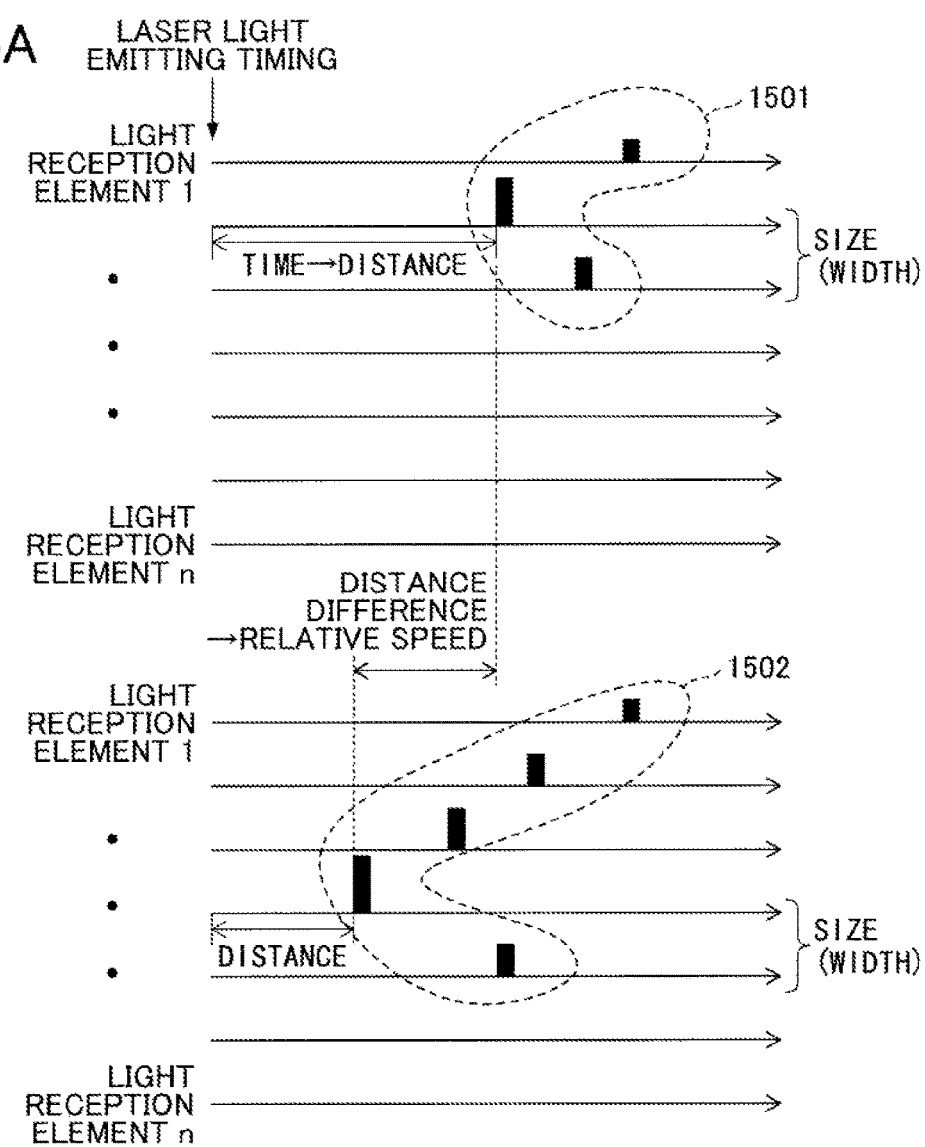
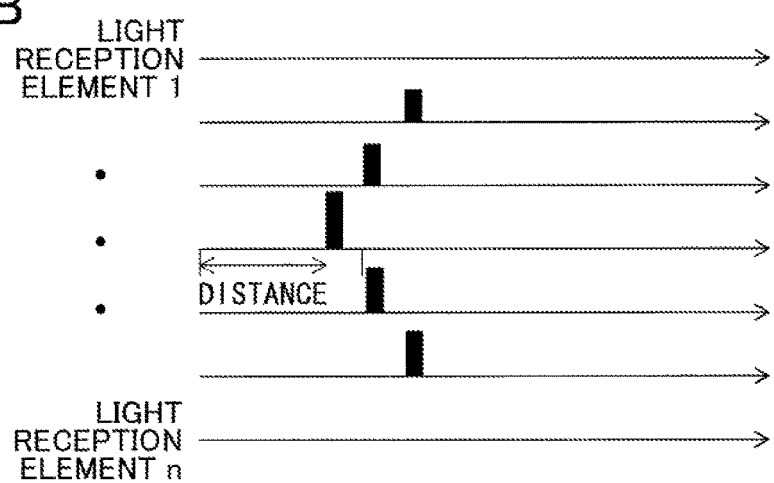
FIG.15A
FIG.15B

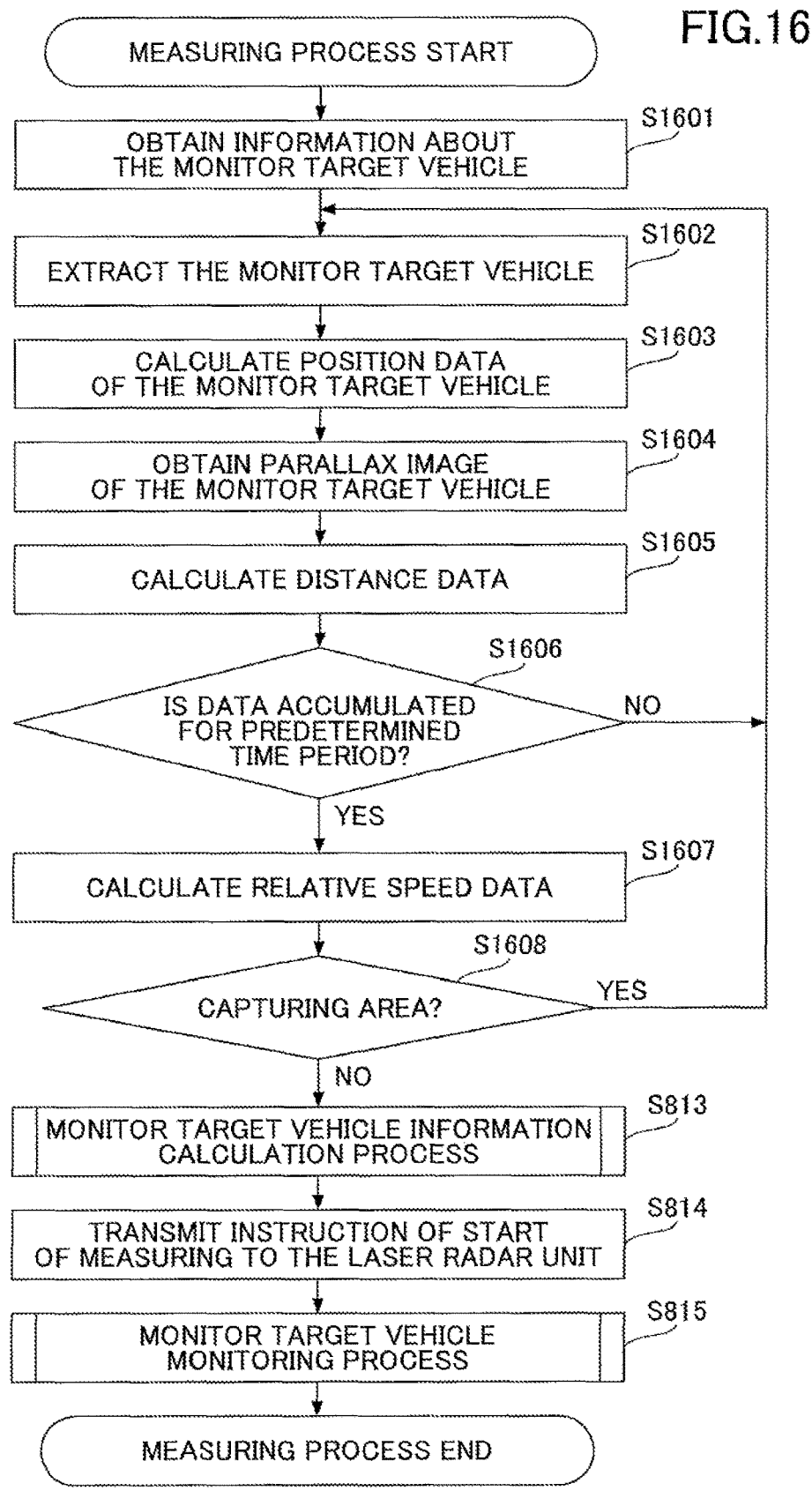

FIG.17A  $T=t'_1$
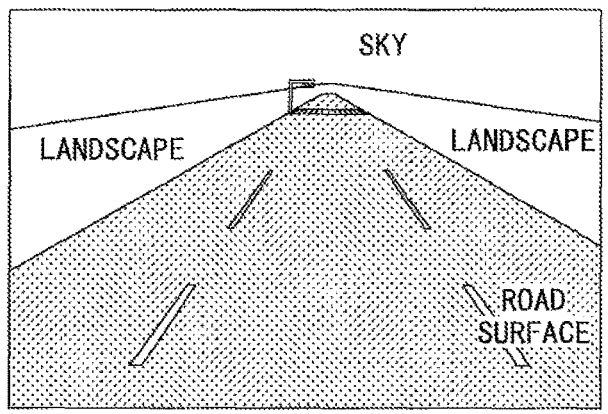
FIG.17B  $T=t'_2$
$D=d'_2$
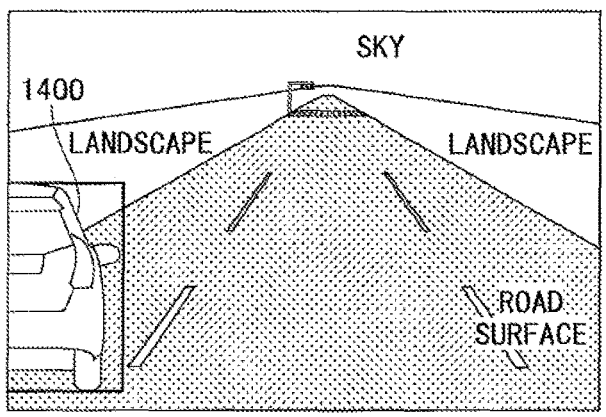
FIG.17C  $T=t'_3$
$D=d'_3$
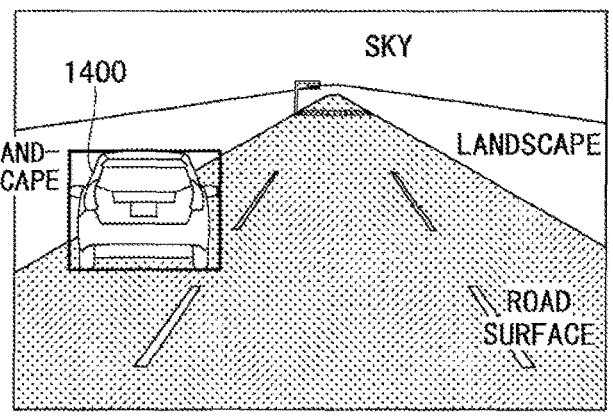
FIG.17D  $T=t'_4$
$D=d'_4$
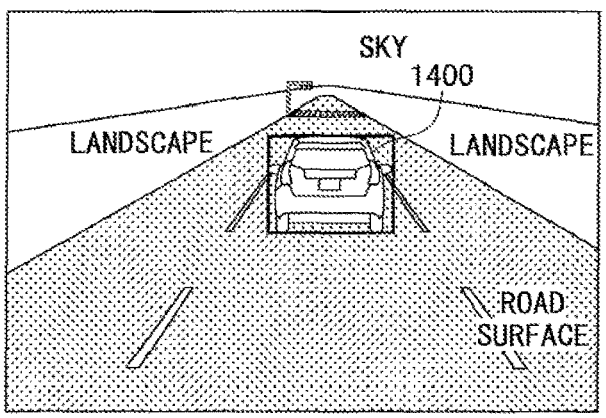

MEASURING SYSTEM, MEASURING PROCESS, AND NON-TRANSITORY RECORDING MEDIUM

BACKGROUND OF THE INVENTION

1. Field of the Invention

The disclosures herein generally relate to a measuring system, a measuring process, and a non-transitory recording medium for causing a computer to execute a process.

2. Description of the Related Art

A measuring system which includes a measuring device such as an imaging device provided on a moving body such as a vehicle is known in the art. The measuring system monitors an obstacle or the like in front of the moving body, based on the measuring result (captured image or the like). The measuring system is needed to be applied to a safety system which controls movement of the moving body. Japanese Patent No. 4265931 discloses a technique with regard to an apparatus which measures an obstacle.

However, the measuring device of the measuring system measures only a front area of the moving body and cannot monitor an obstacle positioned at a lateral side of the moving body. Thus, for example, the measuring system provided on a vehicle or the like cannot detect an approach of another vehicle, which is driving on an adjacent lane, in a direction perpendicular to a driving direction. The measuring system also cannot detect that a distance between the own vehicle and the other vehicle becomes shorter when the own vehicle, which overtook the other vehicle, returns to an original lane.

For example, to provide a measuring device on the lateral side of the moving body in order to monitor the lateral side of the moving body at all times makes a processing load and electric power consumption of the measuring system high, resulting in the measuring cost being increased.

SUMMARY OF THE INVENTION

It is a general object of at least one embodiment of the present invention to provide a measuring system, a measuring process, and a non-transitory recording medium for causing a computer to execute a process that substantially obviates one or more problems caused by the limitations and disadvantages of the related art.

In one embodiment, a measuring system includes a first measuring unit configured to measure an object in front of a moving body in a first measuring area, a second measuring unit configured to measure the object in a second measuring area, the second measuring area being different from the first measuring area, a determining unit configured to determine whether a movement of the object satisfies a predetermined condition based on a measuring result of the first measuring unit, and a controller configured to cause the second measuring unit to start measuring the object in response to an event in which the determining unit determines that the object satisfies the predetermined condition and at least part of the object deviates from the first measuring area.

An embodiment of the present invention also provides a measuring process includes a step of measuring an object in front of a moving body in a first measuring area, a step of measuring the object in a second measuring area, the second measuring area being different from the first measuring area, a step of determining whether a movement of the object satisfies a predetermined condition based on a measuring result of the first measuring unit and a step of causing the second measuring unit to start measuring the object in response to an event in which the determining unit determines that the object satisfies the predetermined condition and at least part of the object deviates from the first measuring area.

An embodiment of the present invention also provides a non-transitory recording medium for causing a computer to execute a process, the process including a step of measuring an object in front of a moving body in a first measuring area, a step of measuring the object in a second measuring area, the second measuring area being different from the first measuring area, a step of determining whether a movement of the object satisfies a predetermined condition based on a measuring result of the first measuring unit and a step of causing the second measuring unit to start measuring the object in response to an event in which the determining unit determines that the object satisfies the predetermined condition and at least part of the object deviates from the first measuring area.

BRIEF DESCRIPTION OF THE DRAWINGS

FIGS. 9A, 9B, 9C and 9D are drawings exemplarily illustrating the captured images captured when the measuring processes are executed;

FIGS. 11A, 11B and 11C are drawings for describing a moving speed of the other vehicle in the cross direction;

FIGS. 15A and 15B are drawings exemplarily illustrating light reception data of each of the light reception elements of the laser radar unit;

FIG. 16 is a flowchart illustrating a flow of measuring processes of the measuring system according to a second embodiment;

FIGS. 17A, 17B, 17C and 17D are drawings exemplarily illustrating the captured images captured when the measuring processes are executed.

DESCRIPTION OF THE PREFERRED EMBODIMENTS

In the following, embodiments of the present invention will be described with reference to the accompanying drawings.

[A First Embodiment]

<1. Entire Configuration of a Measuring System>

Figure 1:
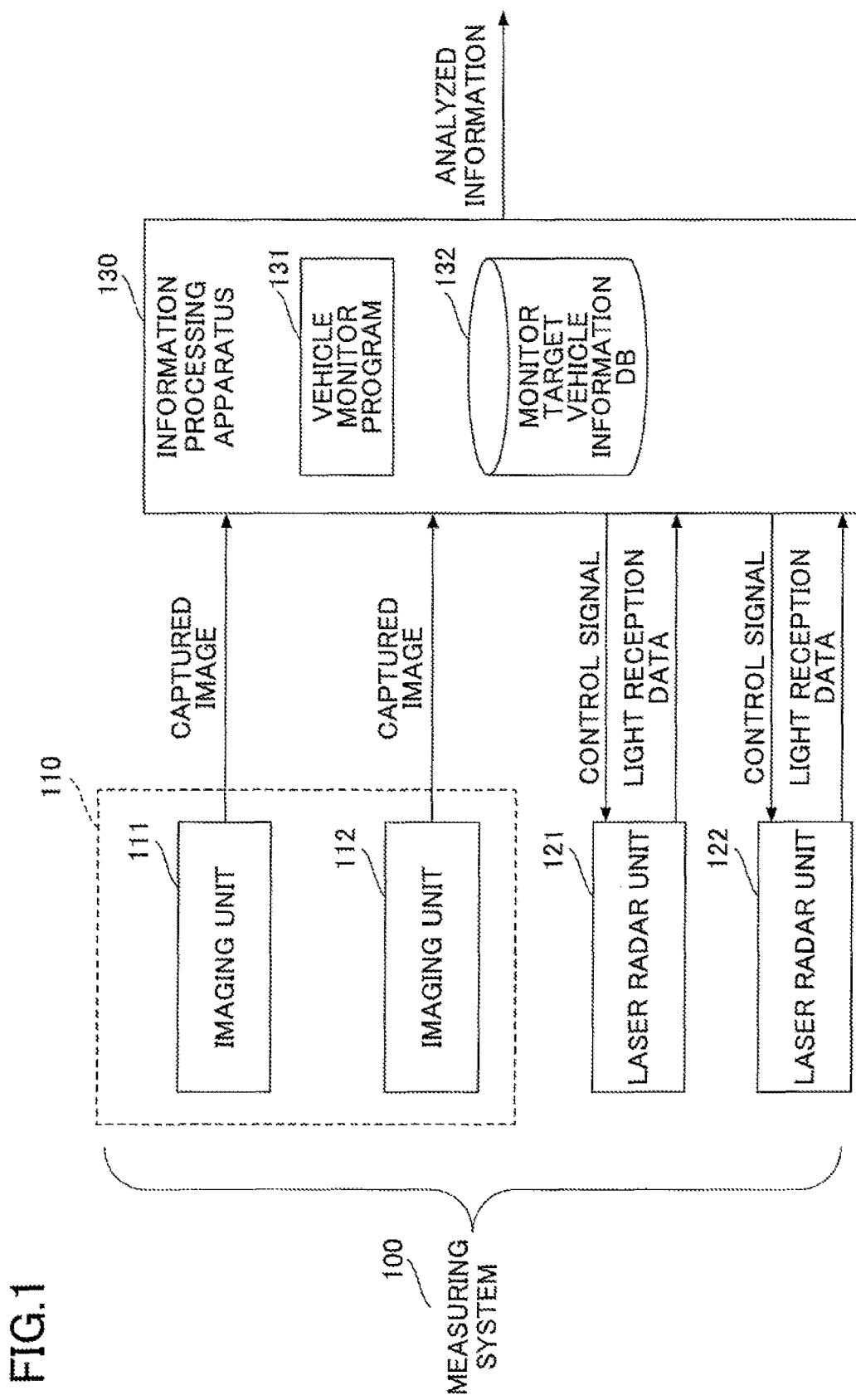
FIG. 1 is a drawing illustrating an entire configuration of a measuring system according to a first embodiment.

In the following, an entire configuration of a measuring system according to a first embodiment is described. FIG. 1 is a drawing illustrating the entire configuration of the measuring system 100 according to the first embodiment. As shown in FIG. 1, the measuring system 100 includes a stereo imaging unit 110, a laser radar unit 121, a laser radar unit 122, and an information processing apparatus 130.

The stereo imaging unit 110 includes a monocular imaging unit 111 and a monocular imaging unit 112. The imaging units 111 and 112 perform capturing in a predetermined frame cycle, and transmit captured images (moving images) to the information processing apparatus 130. The imaging units 111 and 112 may function synchronously.

The laser radar units 121 and 122 emit laser light in a wide angle in order to irradiate an irradiating object with laser light. The laser light, which is emitted from the laser radar units 121 and 122, reflects from the irradiating object. The laser light reflected from the irradiating object is received by the laser radar units 121 and 122, and is transmitted to the information processing apparatus 130 as light reception data. A start of measuring and an end of measuring by the laser radar units 121 and 122 is controlled based on control signals transmitted from the information processing apparatus 130.

The information processing apparatus 130 includes a vehicle monitor program 131 and a monitor target vehicle information DB 132. The vehicle monitor program 131 extracts another vehicle from captured images captured by the imaging units 111 and 112, and determines whether the other vehicle which is extracted satisfies a predetermined condition. The vehicle monitor program 131 instructs the laser radar units 121 and 122 to start measuring the other vehicle in a case in which at least part of the other vehicle, which is determined as satisfying the predetermined condition, deviates from the capturing area of the imaging units 111 and 112. The vehicle monitor program 131 also instructs the laser radar units 121 and 122 to finish monitoring the other vehicle in a case in which the other vehicle, which is determined as satisfying the predetermined condition, deviates from the measuring area of the laser radar units 121 and 122.

<2. Arrangement of Imaging Units and Laser Radar Units>

Next, an example arrangement of the imaging unit 111, the imaging unit 112, the laser radar unit 121, and the laser radar unit 122 in a case where the measuring system 100 is applied for a vehicle is described.

Figure 2A:
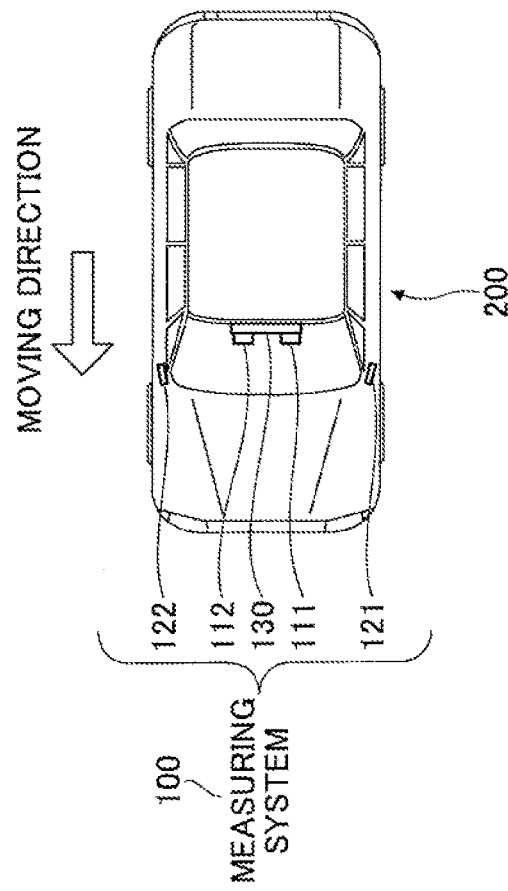
FIGS. 2A and 2B are drawings illustrating an example arrangement of a stereo imaging unit, a laser radar unit and an information processing apparatus in a case where the measuring system is applied for the vehicle.
Figure 2B:
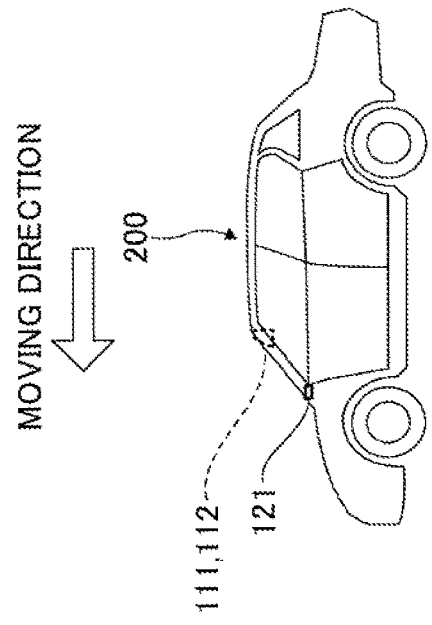

FIGS. 2A and 2B are drawings illustrating an example arrangement of the imaging unit 111, the imaging unit 112, the laser radar unit 121, the laser radar unit 122 and the information processing apparatus 130 in the case where the measuring system 100 is applied for the vehicle.

As shown in FIG. 2A, the imaging units 111 and 112 are attached in the vicinity of a front windscreen inside a vehicle 200 and attached at a central position in a width direction of the vehicle 200. The imaging units 111 and 112, and the information processing apparatus 130 are attached integrally. At the attached position, the imaging units 111 and 112 capture a front area of the vehicle 200 in a driving direction of the vehicle 200.

As shown in FIG. 2B, the imaging units 111 and 112 are attached on a ceiling, for example a back side of a room mirror, inside the vehicle 200. Thus, the vehicle 200 may capture a far front area of the vehicle 200 in the driving direction of the vehicle 200.

As shown in FIG. 2A, the laser radar unit 121 is attached to a left side surface of the vehicle 200 with respect to the driving direction of the vehicle 200. The laser radar unit 122 is attached to a right side surface of the vehicle 200 with respect to the driving direction of the vehicle 200. At the attached positions, the laser radar units 121 and 122 measure lateral areas (left side area and right side area) of the vehicle 200 with respect to the driving direction of the vehicle 200.

As shown in FIG. 2B, the laser radar units 121 and 122 are attached at a central position in the height direction of the vehicle 200. Thus, the laser radar units 121 and 122 may detect the other vehicle positioned at the lateral side of the vehicle 200 certainly.

<3. Capturing Area of the Stereo Imaging Unit and Measuring Area of the Laser Radar Unit>

Figure 3A:
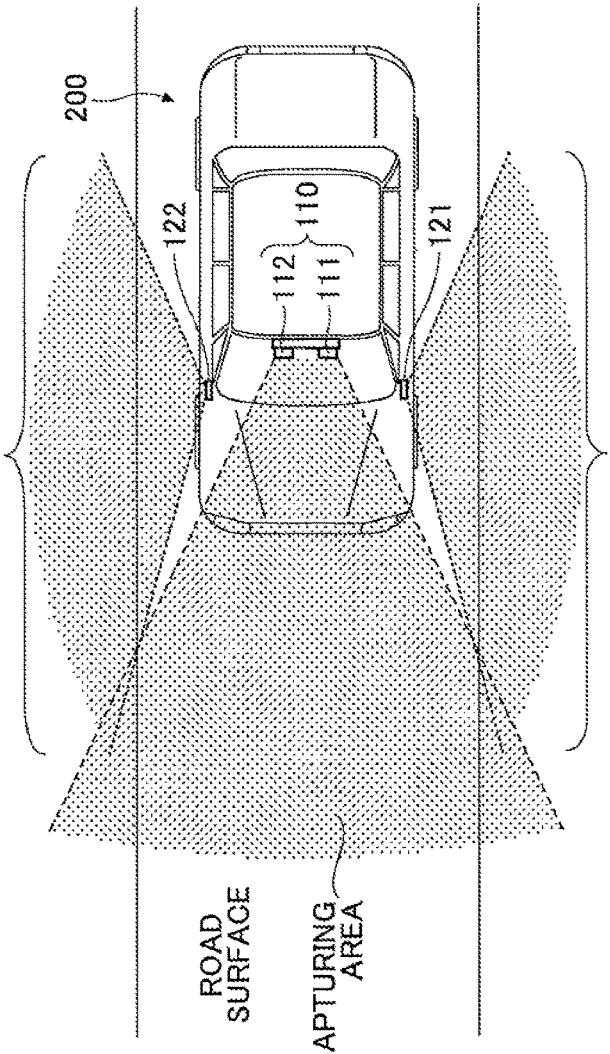
FIGS. 3A and 3B are drawings exemplarily illustrating a capturing area of the stereo imaging unit and a measuring area of the laser radar unit.
Figure 3B:
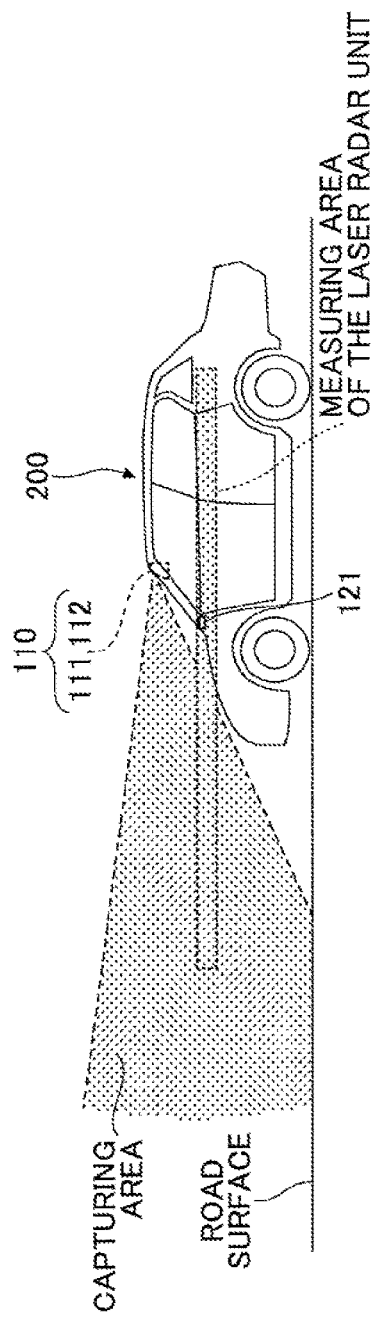

Next, a capturing area of the stereo imaging unit 110 and measuring areas of the laser radar units 121 and 122 are described. FIGS. 3A and 3B are drawings exemplarily illustrating a capturing area of the stereo imaging unit 110 and a measuring area of the laser radar units 121 and 122. As shown in FIGS. 3A and 3B, the capturing area (first spatial measuring area) of the stereo imaging unit 110 and the measuring area (second spatial measuring area) of the laser radar unit 121 different from each other at least partially.

As shown in FIG. 3A, the laser radar unit 121 emits laser light in a wide angle from a diagonal left front of the vehicle 200 to a diagonal left back of the vehicle 200. Thus, a distance between the vehicle 200 and the other vehicle which is positioned at a left side of the vehicle 200 (area from the diagonal left front to the diagonal left back) or the like may be calculated.

Similarly, the laser radar unit 122 emits laser light in a wide angle from a diagonal right front of the vehicle 200 to a diagonal right back of the vehicle 200. Thus, a distance between the vehicle 200 and the other vehicle which is positioned at a right side of the vehicle 200 (area from the diagonal right front to the diagonal right back) or the like may be calculated.

As shown in FIG. 3B, the laser radar units 121 and 122 emit laser light, at a predetermined height position from a road surface, substantially parallel to the road surface. As shown in FIGS. 3A and 3B, the measuring angle of the laser radar unit 121 or 122 with respect to a lateral side of the vehicle 200 is greater than the measuring angle of the stereo imaging unit 110 with respect to the front side of the vehicle 200.

<4. Using Scene of the Measuring System>

Figure 4A:
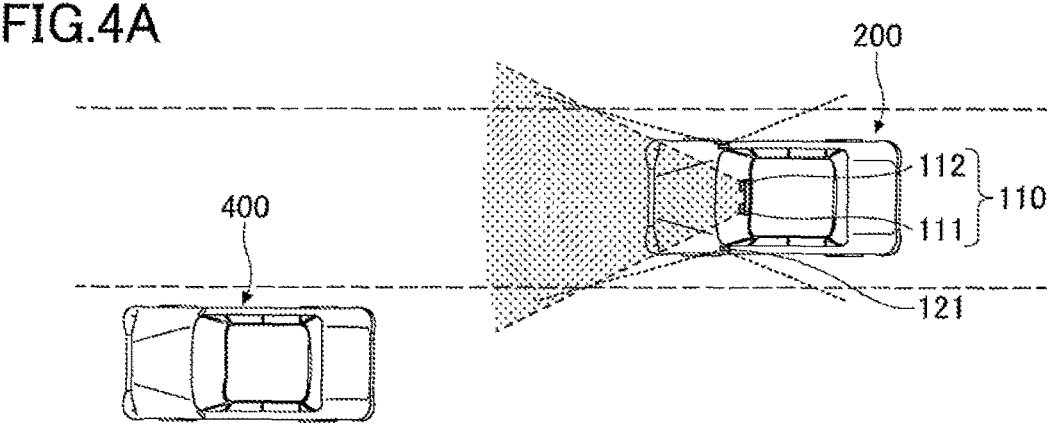
FIGS. 4A, 4B and 4C are drawings exemplarily illustrating a using scene of the measuring system.
Figure 4B:
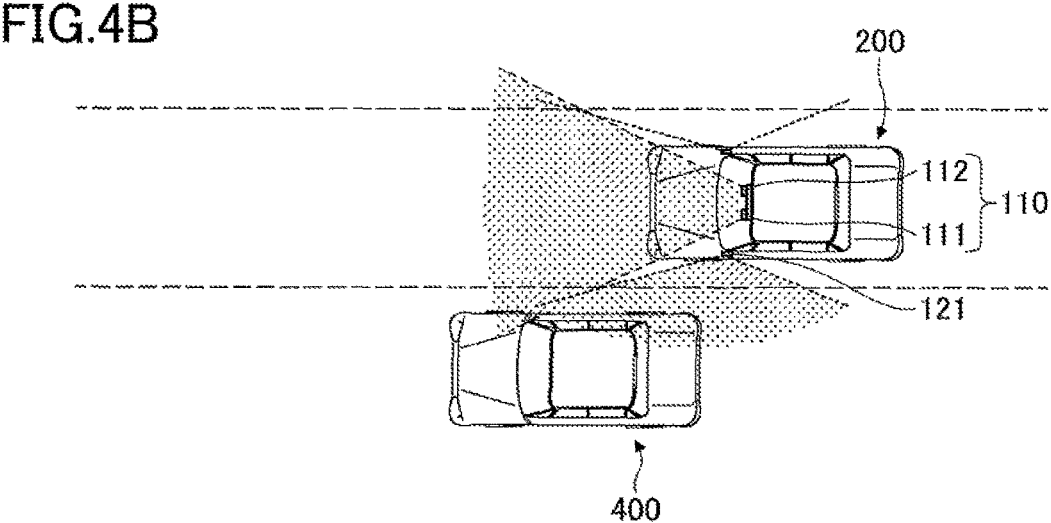
Figure 4C:
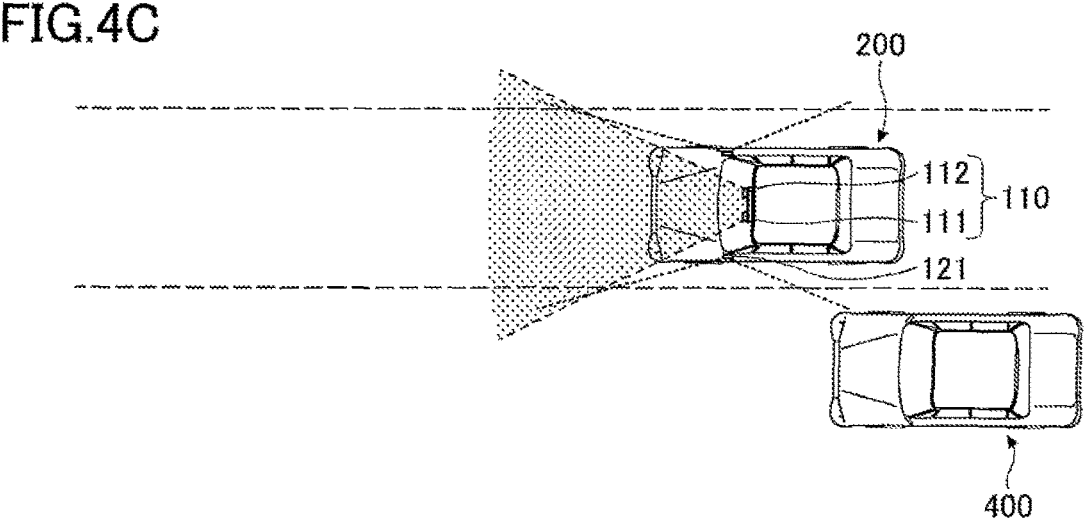

Next, a using scene of the measuring system 100 is described. FIGS. 4A, 4B and 4C are drawings exemplarily illustrating a using scene of the measuring system 100. FIG. 4A shows a situation where a road has a plurality of lanes, the own vehicle 200 (vehicle on which the measuring system 100 is mounted) is driving (traveling) on a center traffic lane, and the other vehicle 400 is driving on a left side lane of the vehicle 200. As shown in FIG. 4A, the other vehicle may be captured by the stereo imaging unit 110 of the vehicle 200.

FIG. 4B shows a situation where the other vehicle 400, which is driving on the left side lane of the own vehicle 200, is approaching the own vehicle 200. In a case in which a speed of the own vehicle 200 is faster than a speed of the other vehicle 400 (a relative speed of the own vehicle 200 with respect to the other vehicle 400 is plus), the own vehicle 200 overtakes the other vehicle 400.

As shown in FIG. 4B, in a scene where the own vehicle 200 overtakes the other vehicle 400, the other vehicle 400 is not captured by the imaging units 111 and 112 as the captured images because the other vehicle 400 deviates from the capturing area of the stereo imaging unit 110.

On the other hand, as shown in FIG. 4B, in a state where the other vehicle 400 is deviating from the capturing area of the imaging units 111 and 112, the other vehicle 400 enters into the measuring area of the laser radar unit 121. Thus, a distance between the own vehicle 200 and the other vehicle 400 in the width direction or the like may be measured by starting measuring by the laser radar unit 121.

FIG. 4C shows a situation where the other vehicle 400, which is driving on the left side lane of the own vehicle 200, gets away from the vehicle 200 to the diagonal left back. As shown in FIG. 4C, in a scene where the own vehicle 200 overtook the other vehicle 400, the laser radar unit 121 cannot detect the other vehicle 400 because the other vehicle 400 deviates from the measuring area of the laser radar unit 121. Thus, measuring by the laser radar unit 121 is stopped.

As described above, to control the start of measuring and the end of measuring by the laser radar units 121 and 122 based on a position of the other vehicle 400 enables to measure the lateral side of the vehicle 200 at a low cost.

Although FIGS. 4A, 4B and 4C show the situation where the road has a plurality of lanes and the own vehicle 200 overtakes the other vehicle 400, which is driving on the adjacent lane, using scenes of the measuring system 100 are not limited to this. For example, the measuring system 100 may be usable in a scene where the own vehicle 200 enters into the opposite lane in order to overtake the other vehicle 400, which is driving in front of the own vehicle 200, in a single lane. Note that the other vehicle 400 may not be limited to a four wheel vehicle, the other vehicle 400 may be a two wheel vehicle such as a motorcycle and a bicycle.

That is, the measuring system 100 according to the first embodiment may be usable in scenes where an object detected in the captured area of the stereo imaging unit 110, which captures a front side of the own vehicle 200 (front side area from the own vehicle 200) in the moving direction of the vehicle 200, deviates from the captured area by moving relatively to a lateral side of the own vehicle 200 (lateral side from the own vehicle 200).

<5. Hardware Configuration of the Information Processing Apparatus>

Figure 5:
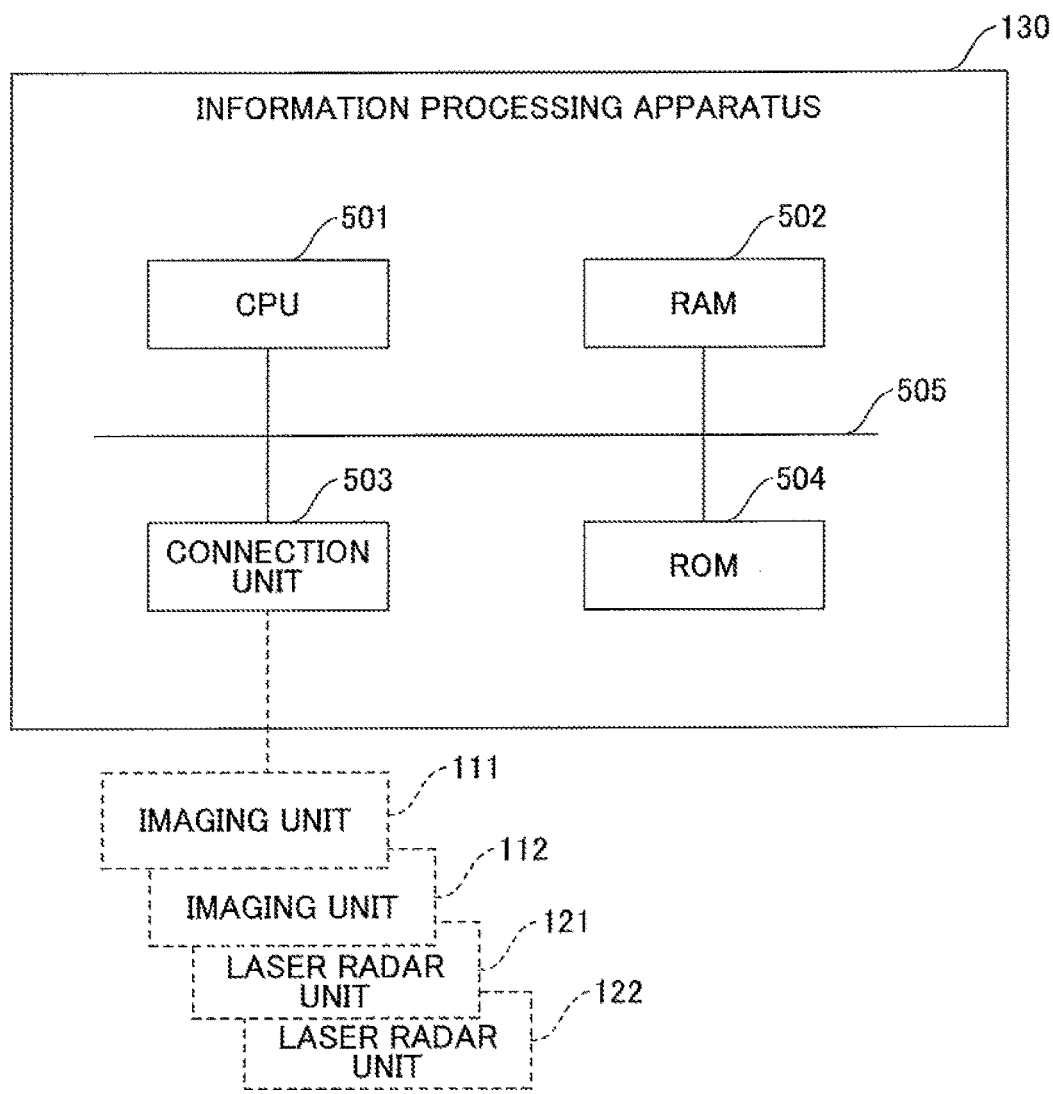
FIG. 5 is a drawing illustrating a hardware configuration of the information processing apparatus.

Next, a hardware configuration of the information processing apparatus 130 is described. FIG. 5 is a drawing illustrating a hardware configuration of the information processing apparatus 130.

For example, the information processing apparatus 130 may be configured by a substrate which is configured as a system on a chip (SOC) including a field programmable gate array (FPGA). More specifically, as shown in FIG. 5, the information processing apparatus 130 includes a central processing unit (CPU) 501, a random access memory (RAM) 502, a connection unit 503, and a read only memory (ROM) 504. These elements of the information processing apparatus 130 are connected to each other via a bus 505.

The CPU 501 is a computer which executes a program (the vehicle monitor program 131 or the like) stored in the ROM 504.

The RAM 502 is a main storage device such as a dynamic random access memory (DRAM), a static random access memory (SRAM), or the like. The RAM 502 functions as a work space in which programs stored in the ROM 504 are held when being executed by the CPU 501. The RAM 502 also functions as a hold space in which information, generated by the CPU 501 executing programs (for example, information of a monitor target vehicle of the monitor target vehicle information DB 132) stored in the ROM 504, is held temporarily.

The connection unit 503 is an interface for connecting and communicating with the stereo imaging unit 110 (the imaging units 111 and 112) and the laser radar units 121 and 122.

The ROM 504 is a memory such as an erasable programmable read only memory (EPROM), an electrically erasable programmable read only memory (EEPROM) or the like. The ROM 504 stores programs (the vehicle monitor program 131 or the like) executed by the CPU 501 and information generated by programs (for example, information of a monitor target vehicle of the monitor target vehicle information DB 132) being executed.

<6. Description of Information of a Monitor Target Vehicle>

Figure 6A:
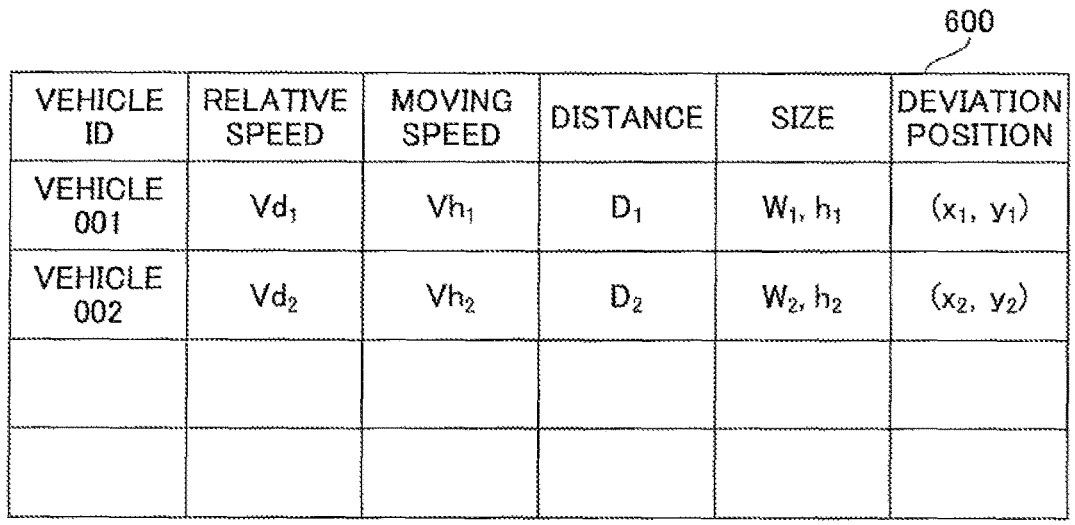
FIGS. 6A and 6B are drawings exemplarily illustrating information of monitor target vehicles.
Figure 6B:
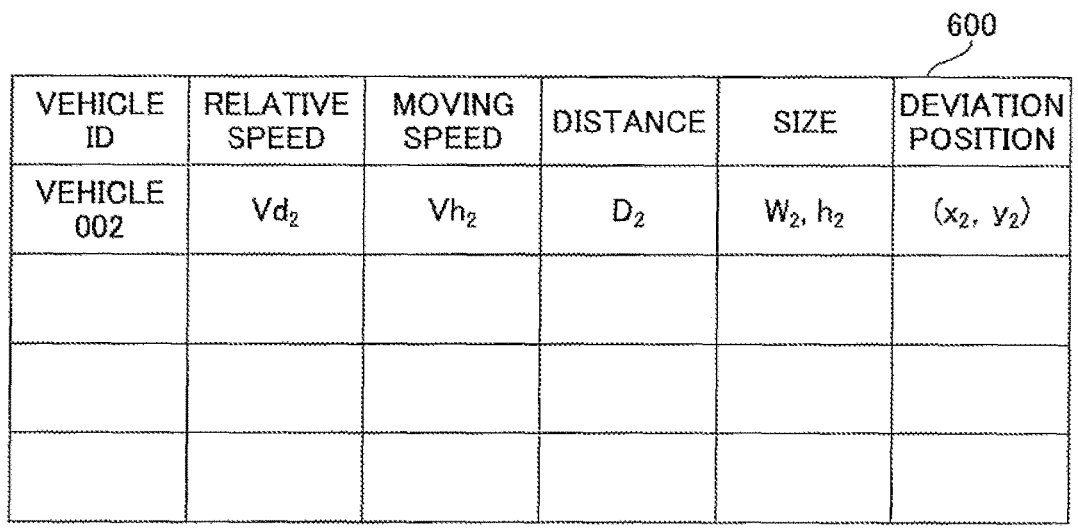

Next, information of a monitor target vehicle stored in the monitor target vehicle information DB 132 is described. FIGS. 6A and 6B are drawings exemplarily illustrating information of monitor target vehicles. As shown in FIGS. 6A and 6B, monitor target vehicle information 600 include "a vehicle ID", "a relative speed", "a moving speed", "a distance", "a size", and "a deviation position" as items of information.

In a case in which another vehicle which satisfies a predetermined condition (referred to as "the monitor target vehicle" hereinafter) is extracted from vehicles in front of the own vehicle 200 based on captured images captured by the stereo imaging unit 110, an identifier, which specifies the other vehicle, is recorded in "the vehicle ID". In other words, it is determined whether the other vehicle satisfies the monitor target condition based on the measuring result of the stereo imaging unit 110.

A relative speed data between the own vehicle 200 and the monitor target vehicle calculated based on captured images captured by the stereo imaging unit 110 is recorded in "the relative speed".

A moving speed data of the monitor target vehicle in a cross direction (lateral direction) of the monitor target vehicle (a direction substantially perpendicular to the moving direction of the monitor target vehicle) calculated based on the captured images captured by the stereo imaging unit 110 is recorded in "the moving speed".

A distance data between the own vehicle 200 and the monitor target vehicle calculated based on the captured images captured by the stereo imaging unit 110 is recorded in "the distance".

A size data of the monitor target vehicle (width, height or the like) calculated based on the captured images captured by the stereo imaging unit 110 is recorded in "the size".

A position data (coordinates) of the monitor target vehicle on the captured images when the monitor target vehicle deviates from the capturing area of the stereo imaging unit 110 is recorded in "the deviation position".

Among items of the monitor target vehicle information 600, data which are recorded in items except items of "the vehicle ID", "the size", and "the deviation position" about the monitor target vehicle are calculated every time the stereo imaging unit 110 captures one frame, and are sequentially updated. The update of data is stopped at a timing when the monitor target vehicle deviates from the capturing area of the stereo imaging unit 110. On the other hand, data is recorded in the "the vehicle ID" at a timing when the other vehicle 400 is determined as the monitor target vehicle. Data are calculated at a timing when the monitor target vehicle deviates from the capturing area of the stereo imaging unit 110 and are recorded in the "the size" and "the deviation position".

Each of the data in the monitor target vehicle information 600 recorded for respective monitor target vehicles is stored in the monitor target vehicle information DB 132 when the monitor target vehicle deviates from the monitoring area of the stereo imaging unit 110, and is used to measure by the laser radar units 121 and 122. Each of the data stored in the monitor target vehicle information DB 132 about the monitor target vehicle is deleted from the monitor target vehicle information DB 132 when the monitor target vehicle deviates from the measuring area of the laser radar unit 121 or 122.

As shown in FIG. 6B, the data of "the vehicle 001" is deleted from the monitor target vehicle information 600 after "the vehicle 001" deviates from the measuring area of the laser radar unit 121 or 122. Thus, only "the vehicle 002" remains as the monitor target vehicle in FIG. 6B. Note that "the vehicle 001" and "the vehicle 002" are examples of the vehicle IDs.

<7. Functions of the Information Processing Apparatus>

Figure 7:
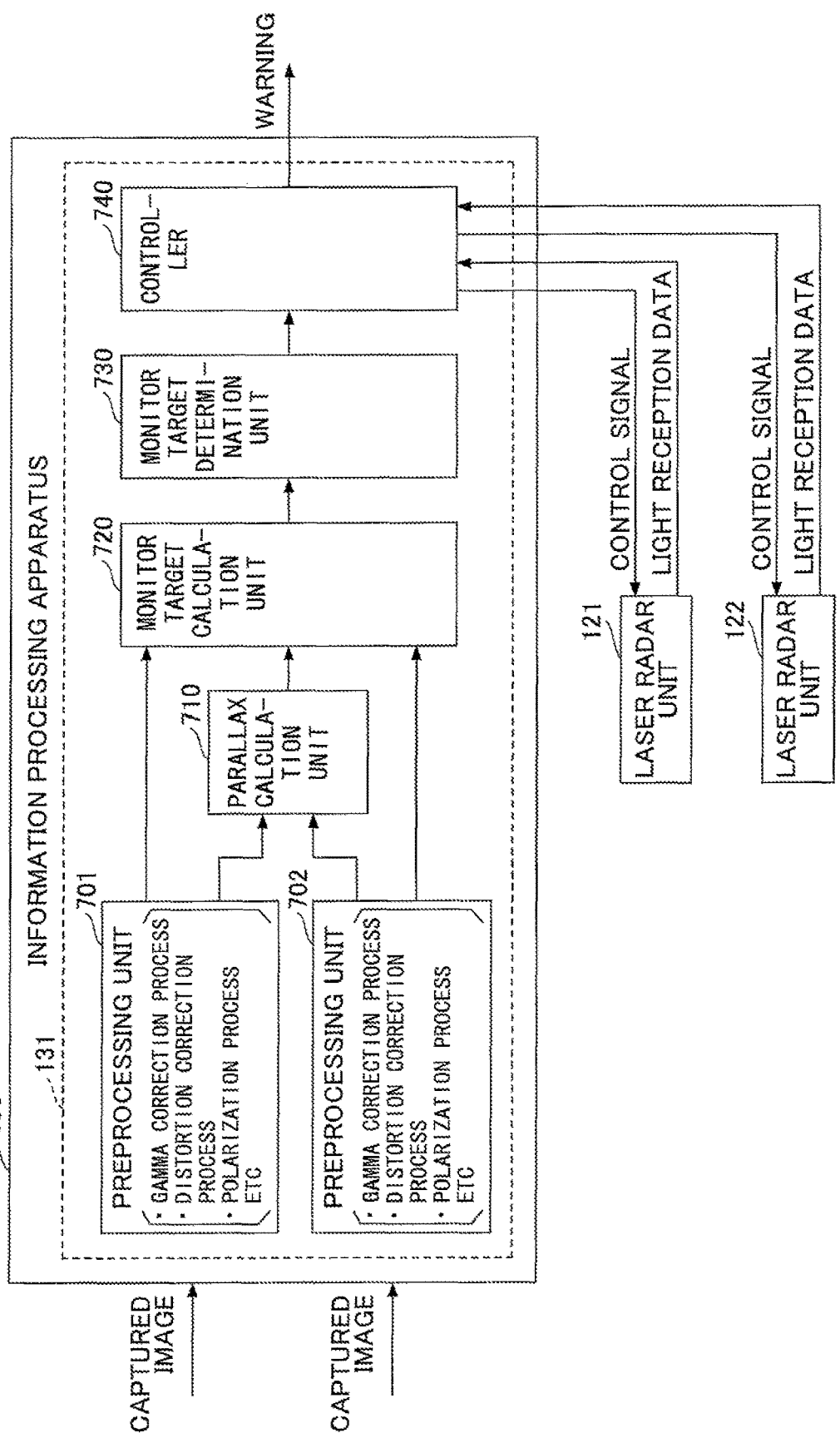
FIG. 7 is a drawing illustrating a functional configuration of the information processing apparatus.

Next, functions achieved in the information processing apparatus 130 by the vehicle monitor program 131 being executed are described. FIG. 7 is a drawing illustrating a functional configuration of the information processing apparatus 130.

As shown in FIG. 7, the information processing apparatus 130 includes a preprocessing unit 701, a preprocessing unit 702, a parallax calculation unit 710, a monitor target calculation unit 720, a monitor target determination unit 730, and a controller 740. These functional elements may be implemented in the information processing apparatus 130 by the vehicle monitor program 131 being executed.

The preprocessing unit 701 obtains the captured image captured by the imaging unit 111 and executes various preprocesses including a gamma correction process, a distortion correction process, a polarization process and the like, to the obtained captured images. The captured image which is preprocessed by the preprocessing unit 701 is output to the parallax calculation unit 710 and the monitor target calculation unit 720.

The preprocessing unit 702 obtains the captured image captured by the imaging unit 112 and executes various preprocesses including a gamma correction process, a distortion correction process, a polarization process and the like, to the obtained captured image. The captured image which is preprocessed by the preprocessing unit 702 is output to the parallax calculation unit 710 and the monitor target calculation unit 720.

The parallax calculation unit 710 generates a parallax image by performing a parallax calculation on the captured image preprocessed by the preprocessing units 701 and 702. The parallax image generated by the parallax calculation unit 710 is output to the monitor target calculation unit 720.

The monitor target calculation unit 720 extracts the other vehicle 400, and calculates a position data (coordinates) and a size data (width, height or the like) based on the captured image which is output from the preprocessing unit 701 or 702. The monitor target calculation unit 720 calculates a distance data to the other vehicle 400 which is extracted, based on the parallax image which is output from the parallax calculation unit 710. The monitor target calculation unit 720 calculates a relative speed data between the own vehicle 200 and the other vehicle 400 based on a change of time of the calculated distance data. The monitor target calculation unit 720 calculates a moving speed data of the other vehicle 400 in the cross direction based on the calculated distance data and a change of time of a position of the other vehicle 400 in the cross direction per time (moving amount per time). The monitor target calculation unit 720 transmits, the vehicle ID for specifying the other vehicle 400 which is extracted, the calculated distance data to the other vehicle 400, the relative speed data between the own vehicle 200 and the other vehicle 400, the moving speed data of the other vehicle 400 in the cross direction, the position data of the other vehicle 400, and the size data of the other vehicle 400, to the monitor target determination unit 730.

The monitor target determination unit 730 determines whether the other vehicle 400 is a monitor target vehicle based on the calculation result of the monitor target calculation unit 720. More specifically, in a case in which the calculation result of the other vehicle 400 satisfies following conditions, the monitor target determination unit 730 judges that dangerous driving is performed and determines the other vehicle 400 as the monitor target vehicle. The following conditions may be conditions that a relative speed data is equal to or less than a predetermined threshold (for example, 50 km/h or less), a moving speed data is equal to or more than a predetermined threshold (for example, 2 m/s or more), and a distance data between the own vehicle and the other vehicle is equal to or less than a predetermined threshold (for example, 10 m or less).

In the case in which the other vehicle 400 is determined as the monitor target vehicle and the monitor target vehicle deviates from the capturing area of the stereo imaging unit 110, the monitor target determination unit 730 notifies the controller 740.

The monitor target determination unit 730 outputs, following information which are calculated at the time in which the monitor target determination unit 730 determines that the monitor target vehicle deviates from the capturing area of the stereo imaging unit 110, to the controller 740. The following information may include the size data of the monitor target vehicle, the relative speed data, the distance data to the other vehicle 400 which is extracted, the vehicle ID, and the deviation position. The controller 740 outputs a control signal which indicates an instruction of the start of measuring to the laser radar unit 121 or 122 in response to the notification from the monitor target determination unit 730. The controller 740 obtains light reception data, which is transmitted from the laser radar unit 121 or 122 based on the output of the control signal.

The controller 740 extracts the light reception data which indicates the monitor target vehicle from the light reception data obtained by the laser radar unit 121 or 122, based on the size data of the monitor target vehicle, the relative speed data, the distance data from the own vehicle 200, and the deviation position data.

The controller 740 calculates the distance to the monitor target vehicle based on the light reception data of the extracted monitor target vehicle, and outputs warning information in a case in which the distance to the monitor target vehicle becomes equal to or less than a predetermined value (for example, 0.5 m or less). For example, the output warning information may be used for motion control of the own vehicle 200.

The controller 740 determines whether the monitor target vehicle deviates from the measuring area of the laser radar unit 121 or 122. In a case in which the controller 740 determines that the monitor target vehicle deviates from the measuring area, the controller 740 outputs a control signal which indicates an instruction of the end of measuring to the laser radar unit 121 or 122.

<8. Measuring Processes in the Measuring System>

Figure 8:
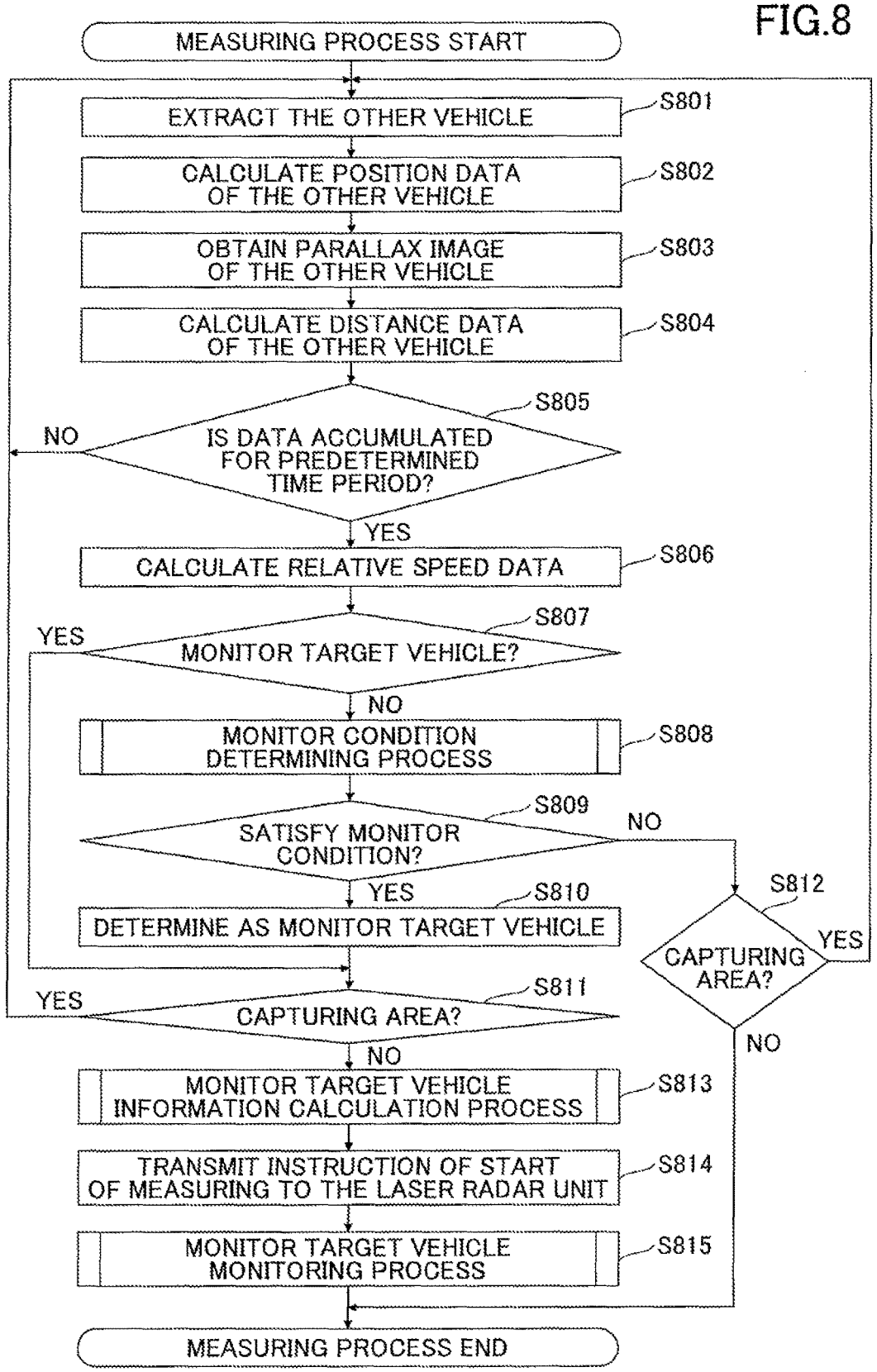
FIG. 8 is a flowchart illustrating a flow of the measuring processes of the measuring system.

Next, the measuring processes of the measuring system 100 are described. FIG. 8 is a flowchart illustrating a flow of the measuring processes of the measuring system 100. The measuring processes shown in FIG. 8 are on the premise that there is a single other vehicle 400 for convenience of description. In a case in which there are a plurality of other vehicles 400, the measuring processes shown in FIG. 8 may be executed in parallel with regard to each of the other vehicles 400.

In step S801, the monitor target calculation unit 720 obtains a captured image of one frame preprocessed by the preprocessing unit 701 or 702, and extracts the other vehicle 400 from the obtained captured image.

In step S802, the monitor target calculation unit 720 calculates a position data (x coordinate and y coordinate on the captured image) of the other vehicle 400 extracted in step S801.

In step S803, the monitor target calculation unit 720 obtains a parallax image generated by the parallax calculation unit 710 based on the position data calculated about the extracted other vehicle 400. In step S804, the monitor target calculation unit 720 calculates a distance data from the own vehicle 200 to the extracted other vehicle 400 based on the parallax image corresponding to the position data calculated about the extracted other vehicle 400.

In step S805, the monitor target calculation unit 720 determines whether the position data and the distance data about the extracted other vehicle 400 are accumulated for a predetermined time period (whether accumulated based on the captured images of a plurality of frames). In a case in which the monitor target calculation unit 720 determines that the position data and the distance data are not accumulated for the predetermined time period in step S805, the process returns to step S801.

On the other hand in a case in which the monitor target calculation unit 720 determines that the position data and the distance data are accumulated for the predetermined time period in step S805, the process goes to step S806. In step S806, the monitor target calculation unit 720 calculates a relative speed data between the other vehicle 400 and the own vehicle 200 based on the distance data for the predetermined time period.

A calculation method of the relative speed is briefly described with reference to FIGS. 9A, 9B, 9C and 9D.

FIGS. 9A, 9B, 9C and 9D are drawings exemplarily illustrating the captured images captured when the measuring processes are executed. FIG. 9A shows a situation where the other vehicle 400 is extracted based on the captured images captured at a time (T) $t_1$. The distance (D) from the vehicle 200 to the other vehicle 400 which is calculated based on the parallax image at the time $t_1$ is $d_1$.

FIG. 9B shows the captured images captured at a time (T) $t_2$. The distance (D) from the vehicle 200 to the other vehicle 400 which is calculated based on the parallax image at the time $t_2$ is $d_2$. In this case, a relative speed $Vd_1$ between the vehicle 200 and the other vehicle 400 from the time $t_1$ to time $t_2$ may be calculated by a formula (1).

$$Vd_1 = \frac{(d_1 - d_2)}{(t_1 - t_2)} \quad \text{(FORMULA 1)}$$

Similarly, a relative speed $Vd_2$ between the vehicle 200 and the other vehicle 400 from the time $t_2$ to time $t_3$ may be calculated based on FIGS. 9B and 9C. Similarly, a relative speed $Vd_3$ between the vehicle 200 and the other vehicle 400 from the time $t_3$ to time $t_4$ may be calculated based on FIGS. 9C and 9D.

In step S807, the monitor target determination unit 730 determines whether the extracted other vehicle 400 is determined as the monitor target vehicle. In a case in which the extracted other vehicle 400 has already been determined as the monitor target vehicle in step S807, the process goes to step S811.

On the other hand, in a case in which the extracted other vehicle 400 is not determined as the monitor target vehicle in step S807 yet, the process goes to step S808. In step S808, the monitor target determination unit 730 executes a monitor condition determining process which determines whether the extracted other vehicle 400 satisfies a monitor condition. The details of the monitor condition determining process will be described later.

In a case in which it is determined that the extracted other vehicle 400 does not satisfy the monitor condition as the result of the monitor condition determining process, the process goes to step S812 from step S809. In step S812, the monitor target determination unit 730 determines whether a part of the extracted other vehicle 400 deviates from the capturing area of the stereo imaging unit 110. The monitor target determination unit 730 may determine whether the entirety of the extracted other vehicle 400 deviates from the capturing area.

In a case in which the monitor target determination unit 730 determines that the extracted other vehicle 400 does not deviate from (stays in) the capturing area of the stereo imaging unit 110 in step S812, the process returns to step S801. Thus, a measuring whether the extracted other vehicle 400 satisfies the monitor condition may be executed for every one frame until the extracted other vehicle 400 deviates from the capturing area of the stereo imaging unit 110.

In a case in which the monitor target determination unit 730 determines that the extracted other vehicle 400 deviates (goes out) from the capturing area in step S812, the measuring process is finished.

As described above, in the case in which the extracted other vehicle 400 deviates from the capturing area without being determined that the extracted other vehicle 400 satisfies the monitor condition, the laser radar units 121 and 122 do not start measuring.

On the other hand, in a case in which it is determined that the extracted other vehicle 400 satisfies the monitor condition as a result of the monitor condition determining process, the process goes to step S810 from step S809. In step S810, the monitor target determination unit 730 determines the extracted other vehicle 400 as the monitor target vehicle.

In step S811, the monitor target determination unit 730 determines whether the part of the extracted other vehicle 400 deviates from the capturing area of the stereo imaging unit 110.

In a case in which the monitor target determination unit 730 determines that the extracted other vehicle 400 does not deviate from the capturing area in step S811, the process returns to step S801. As described above, the processes from step S801 to S806 are executed repeatedly until the part of the other vehicle 400, which is determined as the monitor target vehicle once, deviates from the capturing area of the stereo imaging unit 110, and the position data, the distance data, and the relative speed data are calculated for every one frame.

On the other hand, in a case in which the monitor target determination unit 730 determines that the extracted other vehicle 400 deviates from the capturing area in step S811, the process goes to step S813. In step S813, the monitor target determination unit 730 executes a monitor target vehicle information calculation process which calculates information of the monitor target vehicle determined as deviating from the capturing. The details of the monitor target vehicle information calculation process will be described later.

In step S814, the monitor target determination unit 730 notifies the controller 740 that the monitor target vehicle deviates from the capturing area of the stereo imaging unit 110. In response to the notification, the controller 740 transmits a control signal which indicates an instruction of the start of measuring to the laser radar unit 121 or 122.

In step S815, the controller 740 executes a monitor target vehicle monitoring process based on the light reception data, which is transmitted from the laser radar unit 121 or 122. The details of the monitor target vehicle monitoring process will be described later. The measuring process ends when the monitor target vehicle monitoring process ends.

<9. Flow of the Monitor Condition Determining Process>

Figure 10:
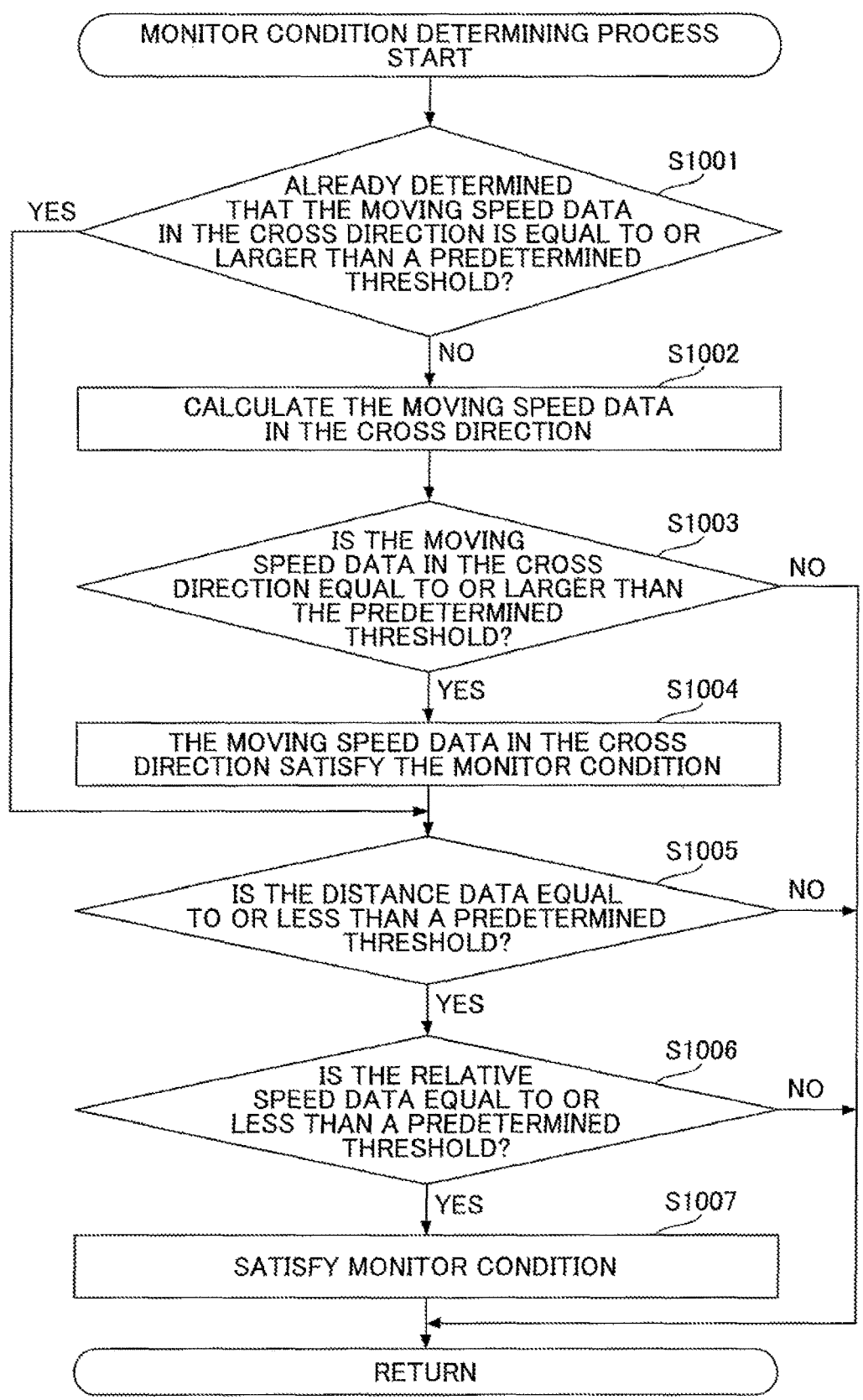
FIG. 10 is a flowchart illustrating a flow of a monitor condition determining process.

Next, a flow of the monitor condition determining process (step S808 shown in FIG. 8) executed by the monitor target calculation unit 720 and the monitor target determination unit 730 is described. FIG. 10 is a flowchart illustrating a flow of the monitor condition determining process executed by the monitor target calculation unit 720 and the monitor target determination unit 730.

In step S1001, with regard to the extracted other vehicle 400, it is determined whether it has been already determined that the moving speed data in the cross direction is equal to or greater than the predetermined threshold. In a case in which it has been already determined that the moving speed in the cross direction is equal to or greater than the predetermined threshold, the process goes to step S1005.

On the other hand, in a case in which it has not been determined yet that the moving speed in the cross direction is equal to or greater than the predetermined threshold, the process goes to step S1002. In step S1002, the monitor target calculation unit 720 calculates the moving speed data in the cross direction of the extracted other vehicle 400.

A calculation method of the moving speed in the cross direction is briefly described with reference to FIGS. 11A, 11B and 11C. FIGS. 11A, 11B and 11C are drawings for describing the moving speed of the other vehicle in the cross direction. FIG. 11A shows a situation where the other vehicle 400 is extracted from the captured image captured at a time (T) $t_1$. The center line 1100 is a straight line passing through the center of the captured image in the cross direction (x direction).

The distance (D) to the other vehicle 400 which is calculated based on the parallax image at the time $t_1$ is $d_1$. On the captured image, the number of pixels between the other vehicle 400 and the center line 100 is $P_1$. The length (L) of one pixel on the captured image at the position where the distance is $d_1$ is $L_1$. In this case an actual length $x_1$ between the other vehicle 400 and the center line 1100 may be calculated by a formula (2).

$$x_1 = L_1 \times P_1 \qquad \text{(FORMULA 2)}$$

FIG. 11B shows the captured image captured at a time (T) $t_2$. The distance (D) to the other vehicle 400 which is calculated based on the parallax image at the time $t_2$ is $d_2$. The number of pixels on the captured image between the other vehicle 400 and the center line 1100 is $P_2$. The length (L) of one pixel on the captured image at the position where the distance is $d_2$ is $L_2$. In this case an actual length $x_2$ between the other vehicle 400 and the center line 1100 may be calculated by a formula (3).

$$x_2 = L_2 \times P_2 \qquad \text{(FORMULA 3)}$$

Thus, the moving speed $Vh_1$ of the other vehicle 400 in the cross direction from the time $t_1$ to time $t_2$ may be calculated by a formula (4).

$$Vh_1 = \frac{(x_1 - x_2)}{(t_1 - t_2)} \qquad \text{(FORMULA 4)}$$

Similarly, the moving speed $Vh_2$ of the other vehicle 400 in the cross direction from the time $t_2$ to time $t_3$ may be calculated based on FIG. 11C.

In step S1003, the monitor target determination unit 730 determines whether the calculated moving speed data in the cross direction is equal to or greater than the predetermined threshold. In a case in which the monitor target determination unit 730 determines that the calculated moving speed data is not equal to or greater than the predetermined threshold, the process returns to step S809 passing through the monitor condition determining process.

On the other hand, in a case in which the monitor target determination unit 730 determines that the calculated moving speed data is equal to or greater than the predetermined threshold, the process goes to step S1004. In step S1004, the monitor target determination unit 730 determines that the moving speed data in the cross direction satisfies the monitor condition. The monitor target determination unit 730 holds the moving speed data in the cross direction of that time.

In step S1005, the monitor target determination unit 730 determines whether the distance data to the extracted other vehicle 400 is equal to or less than a predetermined threshold. In a case in which the monitor target determination unit 730 determines that the distance data is not equal to or less than the predetermined threshold, the process returns to step S809 passing through the monitor condition determining process.

On the other hand, in a case in which the monitor target determination unit 730 determines that the distance data is equal to or less than the predetermined threshold, the process goes to step S1006. In step S1006, the monitor target determination unit 730 determines whether the relative speed data between the vehicle 200 and the extracted other vehicle 400 is equal to or less than a predetermined threshold. In a case in which the monitor target determination unit 730 determines that the relative speed data is not equal to or less than the predetermined threshold, the process returns to step S809 passing through the monitor condition determining process.

On the other hand, in a case in which the monitor target determination unit 730 determines that the relative speed data is equal to or less than the predetermined threshold, the process goes to step S1007. The process returns to step S809 passing through the monitor condition determining process after the monitor target determination unit 730 determines that the extracted other vehicle 400 satisfies the monitor condition in step S1007.

As described above, the moving speed data of the other vehicle 400 in the cross direction is calculated for every frame based on the position data and the distance data of the other vehicle 400 which are calculated for every one frame. And, it is determined whether the moving speed data of the other vehicle 400 is equal to or larger than the predetermined threshold. After it is determined once that the moving speed data in the cross direction satisfies the monitor condition, the other vehicle 400 is monitored as to whether the other conditions (the distance data and the relative speed data) are satisfied until the other vehicle 400 deviates from the capturing area.

It is determined that the monitor condition is satisfied, in a case in which the other vehicle 400 approaches the vehicle 200 in a state that it is determined that the moving speed data in the cross direction satisfies the monitor condition and the distance becomes equal to or less than the predetermined threshold.

<Flow of the Monitor Target Vehicle Information Calculation Process>

Figure 12:
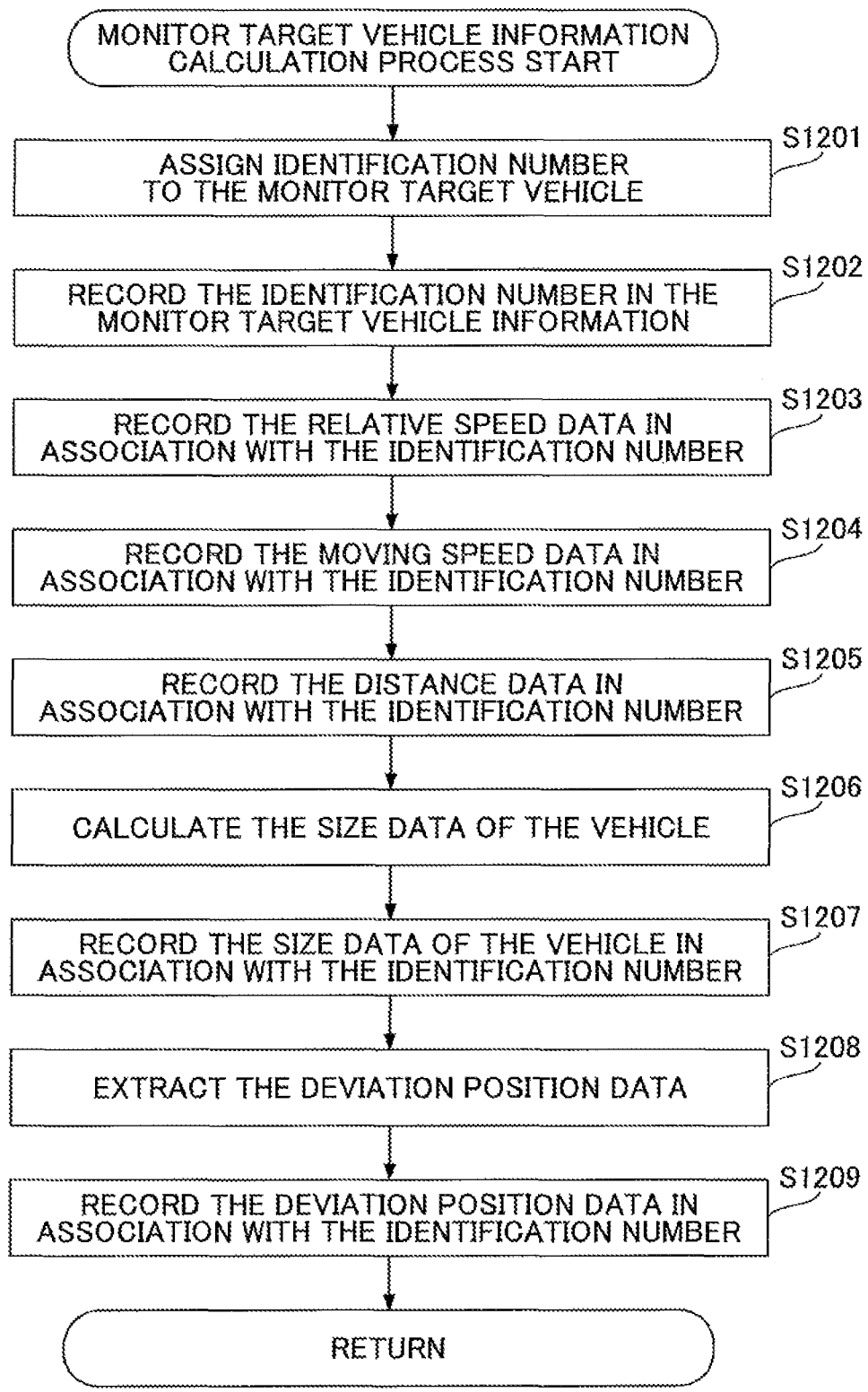
FIG. 12 is a flowchart illustrating a flow of a monitor target vehicle information calculation process.

Next, the flow of the monitor target vehicle information calculation process executed by the monitor target calculation unit 720 and the monitor target determination unit 730 is described. FIG. 12 is a flowchart illustrating a flow of the monitor target vehicle information calculation process executed by the monitor target calculation unit 720 and the monitor target determination unit 730.

In step S1201, the monitor target determination unit 730 assigns an identification number to the other vehicle 400 which is determined as the monitor target vehicle. In step S1202, the monitor target determination unit 730 records the assigned identification number in the monitor target vehicle information 600.

In step S1203, the monitor target determination unit 730 records the relative speed data at the timing immediately before the other vehicle 400, which is determined as the monitor target vehicle, is determined as deviating from the capturing area, in the monitor target vehicle information 600 in association with the identification number.

In step S1204, the monitor target determination unit 730 records the moving speed data held when it is determined that the moving speed of the other vehicle 400 which is determined as the monitor target vehicle in the cross direction is equal to or greater than the predetermined threshold, in the monitor target vehicle information 600 in association with the identification number.

In step S1205, the monitor target determination unit 730 records the distance data to the other vehicle 400 which is determined as the monitor target vehicle (the distance data at the timing immediately before it is determined that the other vehicle 400 deviates from the capturing area), in the monitor target vehicle information 600 in association with the identification number.

In step S1206, the monitor target determination unit 720 calculates the size data (width, height or the like) of the other vehicle 400 based on the captured image captured at the timing immediately before the other vehicle 400, which is determined as the monitor target vehicle, is determined as deviating from the capturing area. In step S1207, the monitor target determination unit 730 records the calculated size data in the monitor target vehicle information 600 in association with the identification number.

In step S1208, the monitor target determination unit 730 extracts the position data on the captured image captured at the timing immediately before the other vehicle 400, which is determined as the monitor target vehicle, is determined as deviating from the capturing area as the deviation position data. In step S1209, the monitor target determination unit 730 records the extracted deviation position data in the monitor target vehicle information 600 in association with the identification number. When the recording of the deviation position data is completed in step S1209, the process returns to step S814.

<11. Flow of the Monitor Target Vehicle Monitoring Process>

Figure 13:
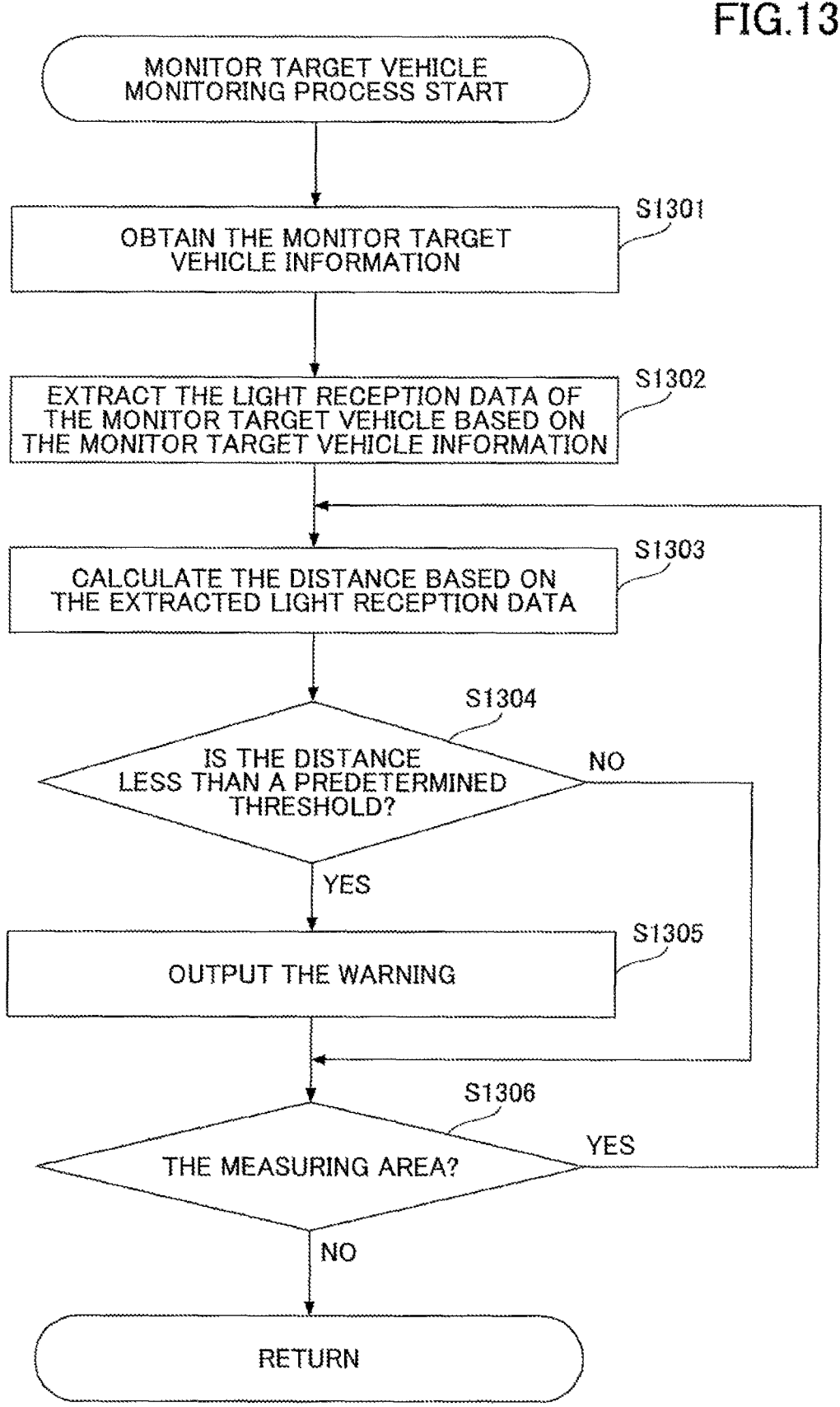
FIG. 13 is a flowchart illustrating a flow of a monitor target vehicle monitoring process.

Next, the monitor target vehicle monitoring process executed by the controller 740 is described. FIG. 13 is a flowchart illustrating a flow of the monitor target vehicle monitoring process executed by the controller 740. The monitor target vehicle monitoring process shown in FIG. 13 is executed in response to the notification that the monitor target vehicle deviates from the capturing area of the stereo imaging unit.

In step S1301, the controller 740 obtains the monitor target vehicle information 600 about the monitor target vehicle which deviates from the capturing area of the stereo imaging unit 110. In step S1302, the controller 740 extracts the light reception data of the monitor target vehicle from the light reception data of the laser radar unit 121 or 122 by using the obtained monitor target vehicle information 600. An extraction method of the light reception data of the monitor target vehicle is briefly described with reference to FIGS. 14A, 14B and 14C and FIGS. 15A and 15B.

Figure 14A:
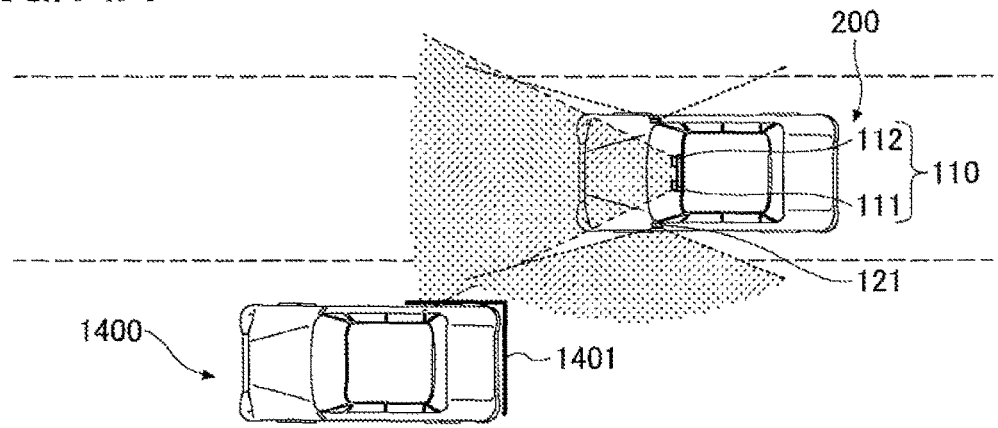
FIGS. 14A, 14B and 14C are drawings illustrating irradiating positions from the laser radar unit with respect to the monitor target vehicle.
Figure 14B:
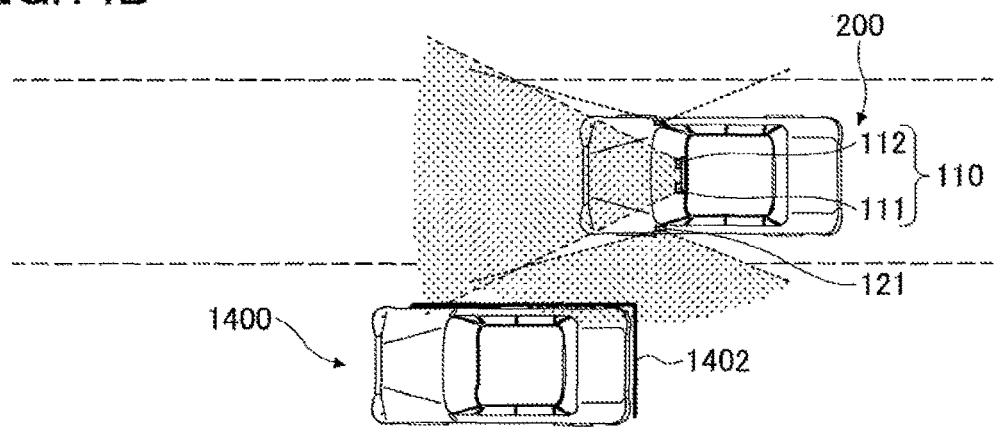
Figure 14C:
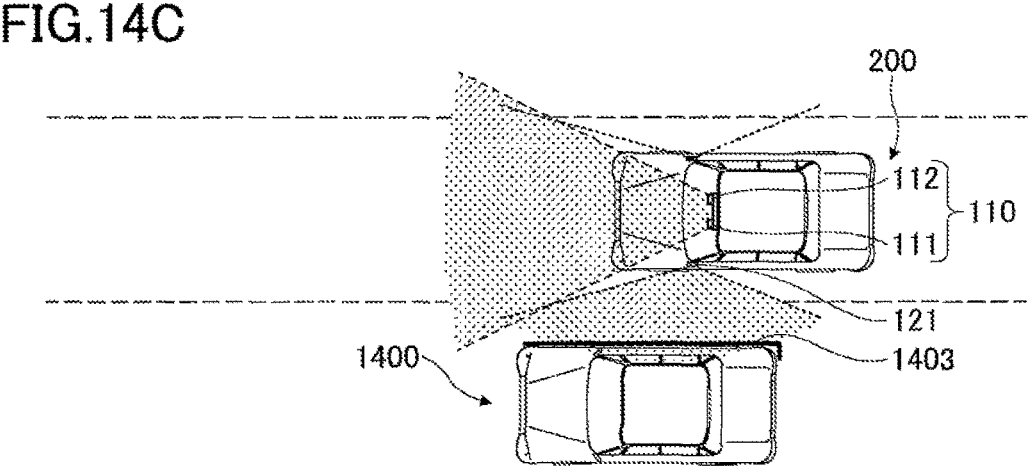

FIGS. 14A, 14B and 14C are drawings illustrating irradiating positions of the laser radar unit 121 with respect to a monitor target vehicle 1400. FIGS. 15A and 15B are drawings exemplarily illustrating light reception data of each of the light reception elements of the laser radar unit 121 (output of each of the light reception elements) in a case in which the laser radar unit 121 irradiates the monitor target vehicle 1400 with the laser light.

As shown in FIG. 14A, the laser radar unit 121 starts measuring and emits the laser light in response to an event in which a part of the monitor target vehicle 1400 deviates from the capturing area of the stereo imaging unit 110. In a case in which the monitor target vehicle 1400 is positioning at the diagonal left front of the own vehicle 200, the laser light emitted from the laser radar unit 121 irradiates a part of the right side surface of the monitor target vehicle 1400 and the entire back surface of the monitor target vehicle 1400 as shown in the irradiating position 1401.

FIG. 15A (a) shows the output of each of the light reception elements of the laser radar unit 121 at that time. In FIGS. 15A and 15B, the abscissa indicates an elapsed time from the laser light emitting timing. In FIGS. 15A and 15B, the ordinate indicates light reception intensity of the light reception data. As shown in FIG. 15A (a), among the light reception elements included in the laser radar unit 121 (from light reception element 1 to light reception element n), a part (some) of the light reception elements detects reflected light from the monitor target vehicle 1400. Among the monitor target vehicle 1400, a detection timing of the reflected light from a position nearest to the laser radar unit 121 is the fastest. And, the detection timing of the reflected light becomes later as a distance from the laser radar unit 121 becomes far. The light reception intensity of the reflected light from the position nearest to the laser radar unit 121 is the highest. And, the light reception intensity of the reflected light becomes lower as the distance from the laser radar unit 121 becomes greater (far)).

The controller 740 may estimate that the light reception elements which can detect the reflected light, among the light reception elements included in the laser radar unit 121, based on the obtained monitor target vehicle information 600. The controller 740 may estimate each of detection timings of the reflected light of the light reception elements estimated to be able to detect the reflected light, based on the deviation position data included in the obtained monitor target vehicle information 600.

The controller 740 may estimate the detection timing of the reflected light of the light reception element whose light reception intensity is the highest among the light reception elements included in the laser radar unit 121 based on the distance data included in the obtained monitor target vehicle information 600. The controller 740 may estimate the light reception elements which receive the reflected light from the back surface of the monitor target vehicle 1400 among the light reception elements included in the laser radar unit 121 based on the size data included in the obtained monitor target vehicle information 600. A dotted line 1501 shown in FIG. 15A (a) indicates the light reception data from the monitor target vehicle 1400 which is extracted based on the above estimation result.

As described above, the monitor target vehicle information 600 is used by the controller 740 as a feature amount for specifying the reception light data which indicates the monitor target vehicle 1400 from the reception light data obtained from the laser radar unit 121 (or the laser radar unit 122 similarly).

Similarly, in a case in which the monitor target vehicle 1400 is positioning at a slightly diagonal left front of the vehicle 200, the laser light emitted from the laser radar unit 121 irradiate the entire right side surface and the entire back surface of the monitor target vehicle 1400 (irradiating position 1402) as shown in FIG. 14B.

FIG. 15A (b) shows the output of each of the light reception elements of the laser radar unit 121 at that time. More specifically, among the light reception elements included in the laser radar unit 121 (from light reception element 1 to light reception element n), more than half of the light reception elements detect reflected light. A detection timing of the reflected light from a position nearest to the laser radar unit 121 is the fastest. And, the detection timing of the reflected light becomes later as a distance from the laser radar unit 121 becomes greater. The light reception intensity of the reflected light from the position nearest to the laser radar unit 121 is the highest. And, the light reception intensity of the reflected light becomes smaller as the distance from the laser radar unit 121 becomes greater.

The controller 740 may estimate the detection timing of the reflected light of the light reception element whose light reception intensity is the highest among the light reception elements included in the laser radar unit 121 based on the relative speed data included in the obtained monitor target vehicle information 600. More specifically, the controller 740 calculates the distance by which the monitor target vehicle 1400 approaches from the time $t_1$ to the time $t_2$ based on the multiplication of the relative speed data by the time difference between the time $t_1$ and the time $t_2$. Thus, it is estimated that the detection timing of the reflected light becomes sooner by the approaching distance.

The controller 740 may estimate the light reception elements which receive the reflected light from the back surface of the monitor target vehicle 1400, among the light reception elements included in the laser radar unit 121 based on the size data included in the obtained monitor target vehicle information 600. A dotted line 1502 shown in FIG. 15A (b) indicates the light reception data from the monitor target vehicle 1400 which is extracted based on the above estimation result.

In step S1303, the controller 740 calculates the distance between the own vehicle 200 and the monitor target vehicle 1400 based on the extracted light reception data about the monitor target vehicle 1400. As shown in FIG. 15A (a) and FIG. 15A (b), for example, the controller 740 calculates the distance between the own vehicle 200 and the monitor target vehicle 1400 based on the detection timing of the reflected light which is detected by the light reception element whose light reception intensity is the highest.

As shown in FIG. 14C, in a case in which the monitor target vehicle 1400 is positioning at a lateral side of the vehicle 200, the laser light emitted from the laser radar unit 121 irradiates the entire right side surface of the monitor target vehicle 1400 (irradiating position 1403).

FIG. 15B shows the output of each of the light reception elements at that time. More specifically, among the light reception elements included in the laser radar unit 121 (from light reception element 1 to light reception element n), most of the light reception elements detect the reflected light. Among the monitor target vehicle 1400, a detection timing of the reflected light from a position nearest to the laser radar unit 121 is the fastest. And, the detection timing of the reflected light becomes later as a distance from the laser radar unit 121 becomes greater. The light reception intensity of the reflected light from the position nearest to the laser radar unit 121 is the highest. And, the light reception intensity of the reflected light becomes lower as the distance from the laser radar unit 121 becomes greater. That is, after the monitor target vehicle 1400 is positioned at the left side of the own vehicle 200 as shown in FIG. 14C, the output of each of the light reception elements of the laser radar unit 121 is obtained as shown in FIG. 15B.

Thus, after the monitor target vehicle 1400 is positioned at the left side of the own vehicle 200 as shown in FIG. 14C, the light reception element whose light reception intensity is the highest is substantially fixed. The distance to the monitor target vehicle 1400 is calculated based on the detection timing of the reflected light of the light reception element whose light reception intensity is the highest.

In step S1304, the controller 740 determines whether a distance between the vehicle 200 and the monitor target vehicle 1400 is less than a predetermined threshold. In other words, the controller 740 determines whether a warning condition is satisfied. In a case in which the controller 740 determines that the distance between is not less than the predetermined threshold in step S1304, the process goes to step S1306.

On the other hand, in a case in which the controller 740 determines that the distance is less than the predetermined threshold in step S1304, the process goes to step S1305. In step S1305, the controller 740 outputs the warning that indicates the distance between the vehicle 200 and the monitor target vehicle 1400 is less than the predetermined threshold.

In step S1306, the controller 740 determines whether the monitor target vehicle 1400 is within (exists in) the measuring area of the laser radar unit 121. In a case in which the controller 740 determines that the monitor target vehicle 1400 is within the measuring area of the laser radar unit 121 in step S1306, the process returns to step S1303. On the other hand, in a case in which the controller 740 determines that the monitor target vehicle 1400 is not within the measuring area in step S1306, the process returns to FIG. 8, and the measuring process is finished. The controller 740 deletes the data about the monitor target vehicle 1400 recorded in the monitor target vehicle information 600 before the measuring process is finished.

<12. Summary>

As described above, the measuring system according to the first embodiment includes the stereo imaging unit configured to capture a front side of the own vehicle and the laser radar unit configured to measure a lateral side of the own vehicle. The measuring system is configured to calculate the distance between the other vehicle ahead and the own vehicle, the relative speed, and the moving speed of the other vehicle ahead in the cross direction. The measuring system is configured to determine the other vehicle ahead as the monitor target vehicle in the case in which the calculation result satisfies the monitor condition. In a case in which the monitor target vehicle deviates from the capturing area of the stereo imaging unit, the measuring system is configured to start measuring by the laser radar unit and to continue measuring until the monitor target vehicle deviates from the measuring area of the laser radar unit.

As described above, the measuring system is configured to capture the front side ahead of the own vehicle by the stereo imaging unit and to monitor the lateral side of the own vehicle by the laser radar unit. Thus, the measuring system may reduce the cost of the apparatus in comparison with a structure which monitors the front side of the own vehicle and the lateral side of the own vehicle by the stereo imaging unit.

Further, the measuring system is configured to start measuring by the laser radar unit in the case in which the monitor target vehicle deviates from the capturing are of the stereo imaging unit. Thus the measuring system may reduce the measuring cost in comparison with a structure which performs the measuring by the laser radar unit at all times.

As a result, the measuring system, which may measure an area other than the front side of the own vehicle at a low cost, may be provided.

Further, the measuring system according to the first embodiment is configured to calculate the feature amount for specifying the monitor target vehicle and to reflect the feature amount to the measuring by the laser radar unit. In a case in which the measuring result of the laser radar unit satisfies the warning condition, the measuring system is configured to output the warning.

As described above, the measuring system is configured to reflect the monitor target vehicle information, which is calculated based on the capturing image captured by the stereo imaging unit which captures the front side ahead of the own vehicle, to the measuring by the laser radar unit. Thus, the measuring system may measure the monitor target vehicle precisely. Further, the measuring system is configured to output the warning based on the measuring result of the laser radar unit. Thus, the measuring system may control the own vehicle in response to the movement of the monitor target vehicle positioning at the lateral side of the vehicle.

[The Second Embodiment]

Although the first embodiment reflects the feature amount for specifying the monitor target vehicle to the measuring by the laser radar unit in the case in which the monitor target vehicle deviates from the capturing area of the stereo imaging unit, the present invention is not limited to this.

For example, the present invention may be a configuration which reflects information for specifying the monitor target vehicle to the measuring by the stereo imaging unit in a case in which the monitor target vehicle deviates from the measuring area of the laser radar unit (in a case in which the monitor target vehicle deviates to a front side of the own vehicle). Thus, a process for determining whether another vehicle is the monitor target vehicle based on the captured image captured by the stereo imaging unit may be omitted. In the following, a second embodiment is described. Differences between the first embodiment and the second embodiment are mainly described. A description of features of the second embodiment similar to the first embodiment is appropriately omitted.

<1. Measuring Processes in the Measuring System According to the Second Embodiment>

First, the measuring processes of the measuring system 100 according to the second embodiment are described with reference to FIG. 16. FIG. 16 is a flowchart illustrating a flow of measuring processes of the measuring system 100. The flowchart shown in FIG. 16 is executed in a case in which the monitor target vehicle 1400 deviates from the measuring area of the laser radar unit 121 or 122 to the front side direction. In the case in which the monitor target vehicle 1400 deviates from the measuring area of the laser radar unit 121 or 122 to the front side direction, the data about the monitor target vehicle 1400 may not be deleted from the monitor target vehicle information 600.

In step S1601, the monitor target determination unit 730 obtains information (vehicle ID) for specifying the monitor target vehicle 1400 from the controller 740. In step S1602, the monitor target calculation unit 720 extracts the monitor target vehicle 1400 from the obtained captured image.

In step S1603, the monitor target calculation unit 720 calculates a position data (x coordinate and y coordinate on the captured image) of the monitor target vehicle 1400.

In step S1604, the monitor target calculation unit 720 obtains a parallax image generated by the parallax calculation unit 710 based on the position data calculated about monitor target vehicle 1400. In step S1605, the monitor target calculation unit 720 calculates a distance data from the own vehicle 200 to the monitor target vehicle 1400 based on the obtained parallax image corresponding to the position data.

In step S1606, the monitor target calculation unit 720 determines whether the position data and the distance data about the monitor target vehicle 1400 are accumulated for a predetermined time period. In a case in which the monitor target calculation unit 720 determines that the position data and the distance data are not accumulated for the predetermined time period in step S1606, the process returns to step S1602.

On the other hand, in a case in which the monitor target calculation unit 720 determines that the position data and the distance data are accumulated for the predetermined time period in step S1606, the process goes to step S1607. In step S1607, the monitor target calculation unit 720 calculates a relative speed data between the monitor target vehicle 1400 and the own vehicle 200. In step S1608, the monitor target determination unit 730 determines whether the monitor target vehicle 1400 is within the capturing area of the imaging unit 111 or 112. In a case in which the monitor target determination unit 730 determines that the monitor target vehicle 1400 is within the capturing area in step S1608, the process returns to step S1602.

On the other hand, in a case in which the monitor target determination unit 730 determines that the monitor target vehicle 1400 is not within the capturing area in step S1608, the process goes to step S813. Processes in step S813 to step S815 are roughly similar to the above described processes shown in FIG. 8.

However, in the monitor target vehicle information calculation process shown in FIG. 12, step S1201, step S1202, step S1205, and step S1206 are not executed in the second embodiment. This is because the identification number, the distance data, and the size data are previously recorded in the monitor target vehicle information 600. In the monitor target vehicle information calculation process shown in FIG.

12, the monitor target determination unit 730 associates each of the data with the vehicle ID obtained in step S1601, and records the data.

<2. Capturing Images in Measuring Process>

Next, the capturing images captured when the measuring processes are executed are described. FIGS. 17A, 17B, 17C and 17D are drawings exemplarily illustrating the captured images captured when the measuring processes are executed.

FIG. 17A shows a capturing image where the monitor target vehicle 1400 is driving on the left side lane of the own vehicle 200, and deviating from the capturing area of the stereo imaging unit 110. FIG. 17A shows a capturing image where the monitor target vehicle 1400 deviates from the measuring area of the laser radar unit 121 and is within the capturing area of the stereo imaging unit 110, by moving to a diagonal left front of the own vehicle 200.

In response to the event in which the monitor target vehicle 1400 deviates from the measuring area of the laser radar unit 121 to the front side direction of the own vehicle 200, the monitor target determination unit 730 obtains the vehicle ID for specifying the monitor target vehicle 1400 from the controller 740. Thus, the monitor target determination unit 730 recognizes the vehicle captured in FIG. 17B as the monitor target vehicle 1400.

FIG. 17C and FIG. 17D show the capturing images which are captured after the monitor target determination unit 730 recognizes the monitor target vehicle 1400. While the monitor target vehicle 1400 is within the capturing area of the stereo imaging unit 110, the monitor target calculation unit 720 continues calculating the position data, the distance data, and the relative speed data about the monitor target vehicle 1400.

As described above, the measuring system according to the second embodiment includes following features in addition to the features of the measuring system according to the first embodiment. The second embodiment is configured to transmit the information for specifying the monitor target vehicle from the controller 740 to the monitor target determination unit 730, in response to the event in which the monitor target vehicle deviates from the measuring area of the laser radar unit. That is, the second embodiment is configured to exchange the information for specifying the monitor target vehicle between the monitor target determination unit 730 and the controller 740.

Thus, in the case in which the monitor target vehicle enters (into) the capturing area of the stereo imaging unit after deviating from the measuring area of the laser radar unit, the second embodiment may omit the process which determines whether the vehicle, which enters (into) the capturing area of the stereo imaging unit, is the monitor target vehicle. As a result, the second embodiment may reduce a processing load when the measuring process of the measuring system is executed.

[The Third Embodiment]

Although the position of the measuring area of the laser radar unit in the height direction is secured, the present invention is not limited to this. For example, the third embodiment may change the position of the measuring area of the laser radar unit in the height direction based on the size of the monitor target vehicle included in the monitor target vehicle information 600.

Figure 18A:
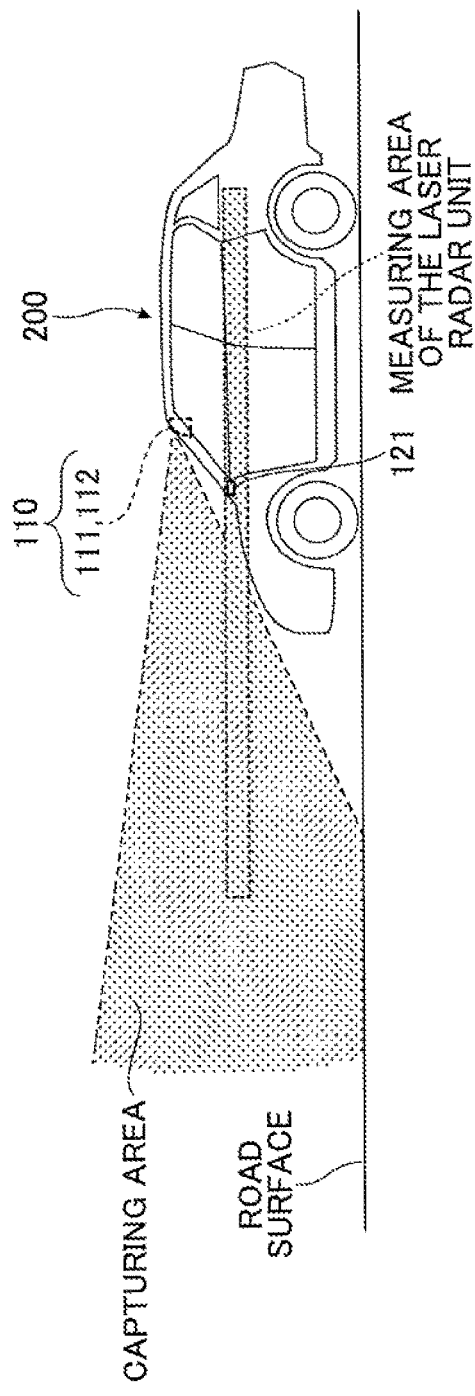
FIGS. 18A and 18B are diagrams illustrating situations where positions of the measuring area of the laser radar unit in the height direction are changed.
Figure 18B:
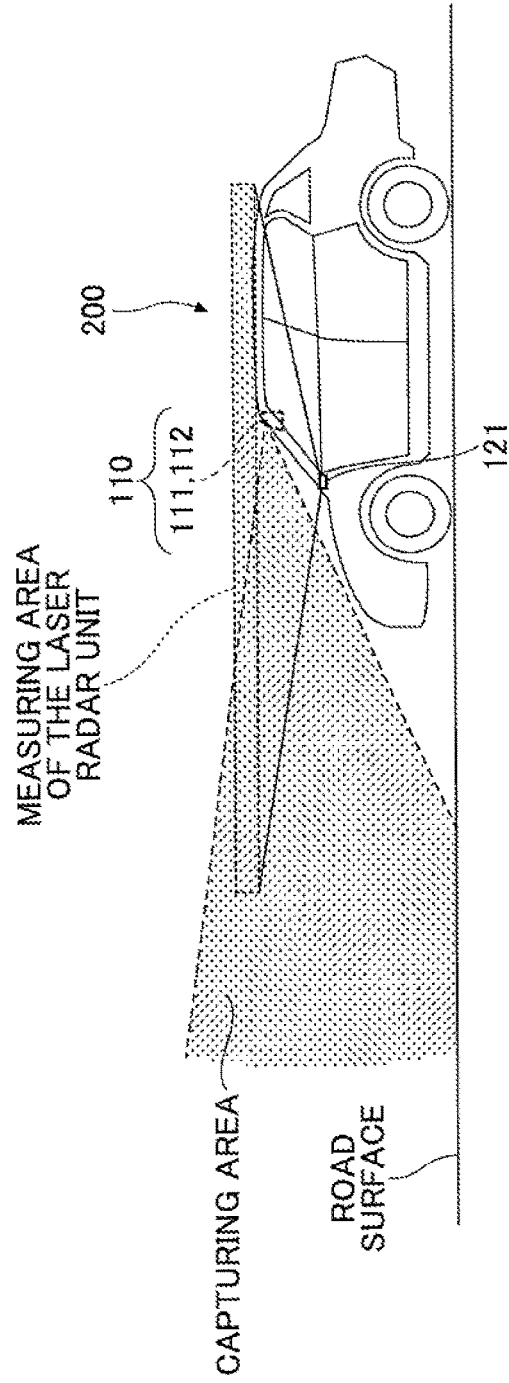

FIGS. 18A and 18B are diagrams illustrating situations where the positions of the measuring area of the laser radar unit in the height direction are changed. FIG. 18A shows the measuring area of the laser radar unit 121 which is set as a default. FIG. 18B shows the measuring area of the laser radar unit 121 in a case in which the size of the monitor target vehicle included in the monitor target vehicle information 600 is equal to or greater than a predetermined threshold.

As shown in FIG. 18B, the third embodiment may raise (change) the position of the measuring area of the laser radar unit in the height direction in the case in which the size of the monitor target vehicle is large, in order to monitor the large size monitor target vehicle precisely.

[The Fourth Embodiment]

Although the measuring system is mounted on the vehicle in the above described embodiments, the present invention is not limited to this. For example, the measuring system may be on another moving body such as a ship, an airplane, or the like.

Further, although the above described embodiments are configured to cause the stereo imaging unit to monitor the front side of the moving body and cause the laser radar unit to monitor the lateral side of the moving body (different area from the front side of the moving body), the present invention is not limited to this. The front side of the moving body and the lateral side (different area from the front side of the moving body) of the moving body may be monitored by another measuring apparatus. However, for monitoring the front side of the moving body, it is preferable to use a measuring apparatus whose measuring distance is long. Further, for monitoring the lateral side (area other than the front side of the vehicle) of the moving body, it is preferable to use a measuring apparatus whose measuring distance is short but whose measuring width is great (wide angle).

Further, although the above described embodiments are configured to execute the monitor target vehicle monitoring process based on the reflected light emitted from the laser radar units 121 and 122 which emit the laser light, the present invention is not limited to this. The monitor target vehicle monitoring process may be executed based on a reflected wave emitted from an electromagnetic wave unit which emits an electromagnetic wave.

Further, although the above described embodiments are configured to use the relative speed data, the moving speed data in the cross direction, and the distance data between the own vehicle and the other vehicle as the monitor condition, the present invention is not limited to this. For example, it may be determined that the monitor condition is satisfied in a case in which the stereo imaging unit detects that the moving speed of the other vehicle in the cross direction is equal to or faster than the predetermined threshold. It may be determined that the monitor condition is not satisfied in a case in which the stereo imaging unit does not detect that the moving speed of the other vehicle in the cross direction is equal to or faster than the predetermined threshold. Further, other parameters may be used for determining whether the dangerous driving is performed.

Further, although the above described embodiments are configured to record the size data, the relative speed data, the distance data between the own vehicle and the other vehicle, the vehicle ID, and the deviation position data, the present invention is not limited to this. Other feature amounts may be used for effectively specifying the reception light data of the monitor target vehicle from the reception light data obtained by the laser radar units 121 and 122.

Further, the present invention is not limited to these embodiments, but various variations and modifications may be made without departing from the scope of the present invention.

The present application is based on Japanese priority application No. 2014-264602 filed on Dec. 26, 2014 with the Japanese Patent Office, the entire contents of which are hereby incorporated by reference.

What is claimed is:

1. A measuring system comprising:
an image capturing unit to capture one or more images of an object in front of a moving body in a capturing area;
a detecting unit to detect the object in a detecting area different from the capturing area;
a determining unit configured to extract the object from the one or more captured images of the object, calculate a distance between the moving body and the extracted object, based on the one or more captured images of the object captured by the image capturing unit, and determine, using at least the distance, calculated based on the one or more captured images of the object captured by the image capturing unit, between the moving body and the extracted object, whether a movement of the object satisfies a predetermined condition; and
a controller configured to cause the detecting unit to start detecting the extracted object in response to an event in which (i) the determining unit determines that the movement of the object satisfies the predetermined condition and (ii) at least part of the object deviates from the capturing area.

2. The measuring system as claimed in claim 1, wherein the determining unit is configured to determine whether the movement of the object satisfies the predetermined condition, based on the distance between the extracted object and the moving body, a relative speed between the object and the moving body, and a moving amount of the object in a direction substantially perpendicular to a moving direction of the moving body per unit time.

3. The measuring system as claimed in claim 1,
wherein the determining unit is configured to calculate target information including the distance between the object and the moving body, a size of the object, and a position at which the object deviates from the capturing area, and the controller refers to the target information to specify the object when said at least part of the object which is determined as satisfying the predetermined condition deviates from the capturing area, which causes the detecting unit to start detecting the extracted object, and
wherein the controller is configured to extract a detection result which indicates the object from a detection result of the detecting unit, based on the target information used to specify the object.

4. The measuring system as claimed in claim 1, wherein the controller is configured to output a warning in response to an event in which the determining unit determines that the distance between the object and the moving body becomes equal to or less than a predetermined threshold based on a detection result of the detecting unit.

5. The measuring system as claimed in claim 3, wherein the determining unit is configured to exchange information for specifying the object with the controller in response to an event in which the object, which is determined as satisfying the predetermined condition, enters into the capturing area from the detecting area after entering into the detecting area from the capturing area.

6. The measuring system as claimed in claim 1, wherein
the image capturing unit includes a stereo imaging unit having a plurality of imaging units, and
wherein the detecting unit includes a laser radar unit.

7. The measuring system as claimed in claim 1, wherein a measuring angle of the detecting unit with respect to a lateral side of the moving body is greater than a measuring angle of the capturing unit with respect to a front side of the moving body.

8. The measuring system as claimed in claim 1,
wherein the determining unit is configured to determine that the movement of the object satisfies the predetermined condition in a case in which the determining unit detects, based on the one or more images captured by the image capturing unit, that a moving speed of the object in a direction perpendicular to a moving direction of the moving body is equal to or faster than a predetermined threshold, and
wherein the determining unit is configured to determine that the movement of the object does not satisfy the predetermined condition in a case in which the determining unit does not detect, based on the one or more images captured by the image capturing unit, that the moving speed of the object in the direction perpendicular to the moving direction of the moving body is equal to or faster than the predetermined threshold.

9. The measuring system as claimed in claim 1,
wherein the controller is configured to cause the detecting unit to detect the object in a case in which the determining unit determines that the movement of the object satisfies the predetermined condition, and
wherein the controller is configured to cause the detecting unit not to measure the object in a case in which the determining unit does not determine that the movement of the object satisfies the predetermined condition.

10. The measuring system as claimed in claim 1, wherein the capturing area and the detecting area are spatial areas.

11. A moving body comprising the measuring system as claimed in claim 1.

12. A measuring process comprising:
(a) capturing one or more images of an object in front of a moving body in a capturing area;
(b) detecting the object in a detecting area different from the first measuring area;
(c) extracting the object from the one or more captured images of the object, calculating a distance between the moving body and the extracted object, based on the one or more captured images of the object captured in (a), and determining, using at least the distance, calculated based on the one or more captured images of the object, between the moving body and the extracted object, whether a movement of the object satisfies a predetermined condition; and
(d) starting the detecting of the object in (b) in response to an event in which (i) the movement of the object is determined in (c) as satisfying the predetermined condition and (ii) at least part of the object deviates from the first measuring area.

13. A non-transitory recording medium for causing a computer to execute a process, the process comprising:
(a) capturing one or more images of an object in front of a moving body in a capturing area;
(b) detecting the object in a detecting area different from the first measuring area;
(c) extracting the object from the one or more captured images of the object, calculating a distance between the moving body and the extracted object, based on the one or more captured images of the object captured in (a), and determining, using at least the distance, calculated based on the one or more captured images of the object, between the moving body and the extracted object, whether a movement of the object satisfies a predetermined condition; and (d) starting the detecting of the object in (b) in response to an event in which (i) the movement of the object is determined in (c) as satisfying the predetermined condition and (ii) at least part of the object deviates from the first measuring area.

\* \* \* \* \*